US008142287B2

(12) United States Patent
Podoloff

(10) Patent No.: US 8,142,287 B2
(45) Date of Patent: Mar. 27, 2012

(54) UNIVERSAL CONTROLLER FOR TOYS AND GAMES

(75) Inventor: Rob Podoloff, Framingham, MA (US)

(73) Assignee: Zeemote Technology Inc., Taipei (TW)

( * ) Notice: Subject to any disclaimer, the term of this patent is extended or adjusted under 35 U.S.C. 154(b) by 635 days.

(21) Appl. No.: 11/744,164

(22) Filed: May 3, 2007

(65) Prior Publication Data

US 2007/0249422 A1 Oct. 25, 2007

Related U.S. Application Data

(63) Continuation-in-part of application No. 11/249,009, filed on Oct. 11, 2005, now Pat. No. 7,280,097.

(51) Int. Cl.
*A63H 30/00* (2006.01)
*A63H 30/02* (2006.01)
*A63H 30/04* (2006.01)
*G06F 17/00* (2006.01)

(52) U.S. Cl. ............... 463/39; 463/36; 463/37; 463/38; 446/454; 446/455; 446/456

(58) Field of Classification Search ............. 463/36–39; 446/454–456
See application file for complete search history.

(56) References Cited

U.S. PATENT DOCUMENTS

| | | | | |
|---|---|---|---|---|
| 4,540,176 A | * | 9/1985 | Baer | 463/37 |
| 5,393,073 A | * | 2/1995 | Best | 463/35 |
| 5,692,956 A | * | 12/1997 | Rifkin | 463/37 |
| 5,697,829 A | * | 12/1997 | Chainani et al. | 446/436 |
| 5,724,074 A | * | 3/1998 | Chainani et al. | 345/474 |
| 5,766,077 A | * | 6/1998 | Hongo | 463/30 |
| 5,809,520 A | * | 9/1998 | Edwards et al. | 711/115 |

(Continued)

FOREIGN PATENT DOCUMENTS

DE 29823417 U1 5/1999

(Continued)

OTHER PUBLICATIONS

Sony Ericsson Mobule Communications AB: "Developers Guideline Bluetooth HID remote control (K700 Series, S700 series, V800 series)" Internet Citation, [Online] Oct. 2004, XP007901961; Retrieved from the Internet: URL:http:mybox.trenger.ro/~torgeir/dg_hid_bt_r2b.pdf> [retrieved on Apr. 11, 2007].

(Continued)

*Primary Examiner* — David L Lewis
*Assistant Examiner* — William H McCulloch, Jr.
(74) *Attorney, Agent, or Firm* — Mauriel Kapouytian & Treffert LLP; Michael Mauriel

(57) ABSTRACT

A method, apparatus and system for interfacing with multiple gaming devices are disclosed. A universal controller includes a communication channel designed to selectively establish one or more bidirectional communication links between the controller and the gaming devices. A data collection unit communicatively coupled to the communication channel is designed to collect data related to a gaming experience of the first gaming device and a gaming experience of the second gaming device. The data collection unit is also designed to transfer to the second gaming device the gaming experience of the first gaming device to affect the gaming experience of the second gaming device. A storage unit communicatively coupled to the data collection unit is designed to store the collected data. Further, an input assembly that includes multiple input elements is included. Each input element is designed to be selectively mapped to one or more functions of the gaming devices.

18 Claims, 20 Drawing Sheets

U.S. PATENT DOCUMENTS

| | | | | |
|---|---|---|---|---|
| 5,873,765 | A * | 2/1999 | Rifkin et al. | 446/301 |
| 5,912,454 | A * | 6/1999 | Castillo et al. | 250/205 |
| 5,977,951 | A * | 11/1999 | Danieli et al. | 345/156 |
| 6,001,015 | A * | 12/1999 | Nishiumi et al. | 463/38 |
| 6,022,273 | A * | 2/2000 | Gabai et al. | 463/39 |
| 6,071,194 | A * | 6/2000 | Sanderson et al. | 463/37 |
| 6,075,195 | A * | 6/2000 | Gabai et al. | 84/645 |
| 6,083,104 | A * | 7/2000 | Choi | 463/6 |
| 6,116,906 | A * | 9/2000 | Rifkin | 434/105 |
| 6,247,994 | B1 * | 6/2001 | DeAngelis et al. | 446/454 |
| 6,279,906 | B1 * | 8/2001 | Sanderson et al. | 273/148 B |
| 6,290,565 | B1 * | 9/2001 | Galyean, III et al. | 446/99 |
| 6,293,798 | B1 * | 9/2001 | Boyle et al. | 434/29 |
| 6,319,010 | B1 * | 11/2001 | Kikinis | 434/169 |
| 6,352,478 | B1 * | 3/2002 | Gabai et al. | 463/42 |
| 6,406,372 | B1 * | 6/2002 | Turmell et al. | 463/43 |
| 6,439,956 | B1 * | 8/2002 | Ho | 446/454 |
| 6,494,762 | B1 * | 12/2002 | Bushmitch et al. | 446/268 |
| 6,497,608 | B2 * | 12/2002 | Ho et al. | 446/456 |
| 6,543,769 | B1 * | 4/2003 | Podoloff et al. | 273/148 B |
| 6,661,351 | B1 * | 12/2003 | Matsushiro | 340/825.69 |
| 6,684,062 | B1 * | 1/2004 | Gosior et al. | 455/73 |
| 6,704,058 | B2 * | 3/2004 | Ranta | 348/465 |
| 6,742,188 | B1 * | 5/2004 | Del Castillo | 725/153 |
| 6,773,344 | B1 | 8/2004 | Gabai et al. | |
| 6,842,804 | B2 * | 1/2005 | Cloud et al. | 710/69 |
| 6,949,002 | B2 * | 9/2005 | Yamaguchi et al. | 446/454 |
| 6,949,003 | B2 * | 9/2005 | Hornsby et al. | 446/484 |
| 6,988,896 | B2 * | 1/2006 | Cho | 434/365 |
| 7,008,288 | B2 * | 3/2006 | Covannon et al. | 446/298 |
| 7,010,628 | B2 * | 3/2006 | Cloud et al. | 710/72 |
| 7,081,033 | B1 * | 7/2006 | Mawle et al. | 446/175 |
| 7,107,196 | B2 * | 9/2006 | Waterston | 703/8 |
| 7,116,310 | B1 * | 10/2006 | Evans et al. | 345/156 |
| 7,217,192 | B2 * | 5/2007 | Nishiyama | 463/43 |
| 7,218,313 | B2 * | 5/2007 | Marcus et al. | 345/169 |
| 7,275,975 | B2 * | 10/2007 | Trageser et al. | 446/435 |
| 7,280,097 | B2 * | 10/2007 | Chen et al. | 345/156 |
| 7,369,117 | B2 * | 5/2008 | Evans et al. | 345/156 |
| 7,503,852 | B2 * | 3/2009 | Murzanski et al. | 463/38 |
| 7,507,158 | B2 * | 3/2009 | Murzanski et al. | 463/38 |
| 7,649,522 | B2 * | 1/2010 | Chen et al. | 345/156 |
| 7,699,703 | B2 * | 4/2010 | Muir et al. | 463/29 |
| 7,704,119 | B2 * | 4/2010 | Evans | 446/454 |
| 7,734,254 | B2 * | 6/2010 | Frost et al. | 455/41.2 |
| 7,740,516 | B2 * | 6/2010 | del Castillo | 446/6 |
| 7,853,645 | B2 * | 12/2010 | Brown et al. | 709/203 |
| 7,932,892 | B2 * | 4/2011 | Chen et al. | 345/156 |
| 2001/0021669 | A1 * | 9/2001 | Gabai et al. | 463/39 |
| 2002/0042301 | A1 * | 4/2002 | Dobrusskin et al. | 463/43 |
| 2002/0090985 | A1 * | 7/2002 | Tochner et al. | 463/1 |
| 2002/0098887 | A1 * | 7/2002 | Himoto et al. | 463/37 |
| 2002/0103025 | A1 * | 8/2002 | Murzanski et al. | 463/37 |
| 2003/0083114 | A1 | 5/2003 | Lavin et al. | |
| 2003/0095156 | A1 | 5/2003 | Klein et al. | |
| 2003/0232649 | A1 * | 12/2003 | Gizis et al. | 463/40 |
| 2004/0107303 | A1 | 6/2004 | Mulligan | |
| 2004/0204240 | A1 * | 10/2004 | Barney | 463/36 |
| 2005/0048918 | A1 * | 3/2005 | Frost et al. | 455/41.2 |
| 2005/0050079 | A1 | 3/2005 | Plastina et al. | |
| 2005/0093846 | A1 | 5/2005 | Marcus et al. | |
| 2007/0035412 | A1 * | 2/2007 | Dvorak et al. | 340/825.69 |
| 2007/0051792 | A1 * | 3/2007 | Wheeler et al. | 235/375 |
| 2007/0080931 | A1 * | 4/2007 | Chen et al. | 345/156 |
| 2007/0080934 | A1 | 4/2007 | Chen et al. | |
| 2007/0249422 | A1 * | 10/2007 | Podoloff | 463/43 |
| 2008/0062120 | A1 * | 3/2008 | Wheeler et al. | 345/156 |
| 2008/0167806 | A1 * | 7/2008 | Wheeler et al. | 701/208 |
| 2010/0238111 | A1 * | 9/2010 | Chen et al. | 345/156 |
| 2010/0267372 | A1 * | 10/2010 | Frost et al. | 455/414.1 |
| 2011/0034251 | A1 * | 2/2011 | Cohen et al. | 463/39 |
| 2011/0199295 | A1 * | 8/2011 | Chen et al. | 345/156 |

FOREIGN PATENT DOCUMENTS

| | | |
|---|---|---|
| EP | A-1253547 | 10/2002 |
| EP | A-1 376319 | 1/2004 |
| WO | WO 92/15083 A | 9/1992 |
| WO | WO 00/10077 A2 | 2/2000 |
| WO | WO 03/007117 A | 1/2003 |
| WO | WO 03/052948 A | 6/2003 |
| WO | WO 2004/019315 A | 3/2004 |
| WO | WO 2006/124379 | 11/2006 |

OTHER PUBLICATIONS

Engadget; Wiimote+RC car=authentic Excite Truck; posted Dec. 21, 2006 at 7:01 a.m. by Darren Murph; 2003-2007, Weblogs, Inc.; 10 pages.

Giant R/C Mario Kart Racer; ThinkGeek, Inc.; 1999-2007; 2 pages.

USB Powered RC Car Simulator; Jun. 29, 2006; Everything USB; 2002-2007; 2 pages.

Oh, "Notification of Transmittal of the International Search Report and The Written Opinion of the International Searching Authority, or the Declaration", PCT/US2008/062536 dated Oct. 22, 2008 (11 pages).

\* cited by examiner

FIG. 9a  ← 900

UNIVERSAL CONTROLLER FOR TOYS AND GAMES

This application is a continuation-in-part to co-pending U.S. patent application Ser. No. 11/249,009, filed on Oct. 11, 2005. The contents of the U.S. patent application Ser. No. 11/249,009 are incorporated in its entirety by reference. This application is also related to co-pending U.S. patent application Ser. No. 10/699,555, filed on Oct. 31, 2003, co-pending U.S. patent application Ser. No. 11/221,412, filed Sep. 6, 2005, and co-pending U.S. patent application Ser. No. 11/519,455 filed Sep. 11, 2006, the contents of which are also incorporated in its entirely by reference.

BACKGROUND

There are various platforms for toys and video games For example, racing and car customization is popular in many formats, e.g., die cast models, slot cars, radio control vehicles, as well as PC, console and mobile game simulations. While the game play may be similar among the different platforms of games and video games (e.g., the customization of the player's car), each different platform generally requires its own unique controller. In addition, a game experience in one platform tends not to be portable to another platform.

SUMMARY

The present inventors recognized that conventional toys and video games require an individual game controller that is not cross compatible with one another. Thus waste (e.g., having to carry a controller for each game, video game, etc.) and inefficiency hampers a user's experience when moving from one platform to another. Also, when embarking on a trip, a user may be forced to limit the number of toys and video games that he can carry simply because a different controller is required for each toy and video game. The present inventors also recognized that conventional toy and video game controllers do not generally allow cross compatibility among different platforms of toys and video games. In addition, user experience cannot easily be ported from one platform to another. Consequently, the present inventors developed a flexible and efficient input accelerator device (e.g., a universal controller or accessory device) and human interface and input system and techniques that may be implemented with a variety of toys and video games across various different platforms. Implementations of the input accelerator device and system and techniques for the device described herein may include various combinations of the following features.

Computer program products, which may be embodied on computer readable-material, are also described. Such computer program products may include executable instructions that cause a computer system to conduct one or more of the method acts described herein. Similarly, computer systems are also described that may include a processor and a memory coupled to the processor. The memory may encode one or more programs that cause the processor to perform one or more of the method acts described herein.

The input accelerator device and human interface and input systems and techniques described herein may provide one or more of the following advantages. An input accelerator device that is a single universal controller may connect to and control various toys and video games. This can create a linkage between a real-life toy (e.g., a radio controlled car) and a simulated video game (e.g., a console or a PC game). The techniques disclosed herein can also provide a method of exchanging information between toys and video games to allow a user experience from one platform to be transferred to another different platform. The techniques described herein also provide an ability to customize a virtual toy (e.g., a car in a video game) and relate such customization to a real toy car. Further, the techniques described herein can provide an ability to automatically track usage and performance information of a toy, and the information can be used to provide recommended maintenance as needed.

Details of one or more implementations are set forth in the accompanying drawings and the description below. Other features and advantages will be apparent from the description and drawings, and from the claims.

DESCRIPTION OF DRAWINGS

FIGS. 9a, 9b and 9c depict a process flow diagram of a process for interlacing with various toys and games.

Like reference symbols in the various drawings indicate like elements.

DETAILED DESCRIPTION

Biomechanics of the Human Hand

The human hand comprises an opposable thumb and four fingers, i.e., the thumb may be used in opposition, in concert, in combination or functional relation with any of the four fingers. Compared to the human fingers, the human thumb may be characterized as having larger range of motion, stronger sustaining force actuation and poorer dexterity. The human base joint of the thumb has three degrees of freedom, such as side-to-side movement, up and down movement, and rotation about the thumb's long axis; while the base joint of the fingers has two degrees of freedom, such as side-to-side and up and down movement. Thus, the thumb typically is considered to have better range of motion than any of the fingers. Also, because the human thumb has a bigger actuation muscle than any of the fingers, it can provide larger sustaining forces than the fingers. But also because of the larger muscle, the human thumb may suffer from diminished fine motor control and rapidity of motion that can be exerted compared to the fingers Thus, the human fingers are more suitable for performing tasks that require fine motor coordination or the ability to pinpoint or rapidly repeat actuation. Optimizing biomechanics of the human hand includes taking advantage of the opposable thumb and four fingers used in concert. For example, input elements (e.g. buttons, pressure sensors) can be disposed on a first surface (e.g., front surface) and a second surface (e.g., a back surface) that facilitate the natural movements of the opposable thumb and four fingers. In some implementations, the second surface is disposed with one or more non-discrete input elements (e.g., pressure sensors) that are designed to be effectuated using the natural side-to-side and up and down movements of the four fingers. The first surface (located opposite to the first surface) is disposed of one or more discrete and/or non-discrete elements data are designed to be effectuated using the thumb.

Hand-Held Input Accelerator Device Hardware Overview

Figure 1:
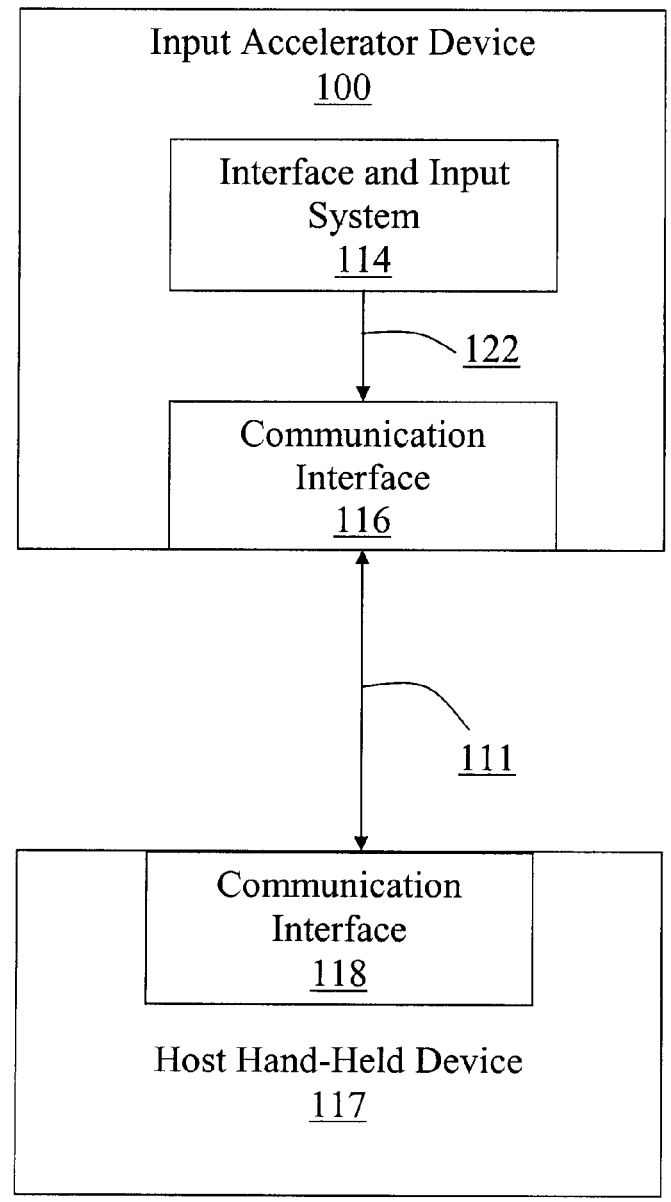
FIG. 1 is a block diagram of a hand-held input accelerator device upon which a human interface and input system may be implemented.

FIG. 1 is a high-level block diagram of a hand-held input accelerator device 100 upon which the human interface and input system and associated input techniques described herein may be implemented for controlling software applications stored and running on a hand-held host device 117. The input accelerator device 100 is a companion auxiliary device to the hand-held host device 117, whereby a user may interface with the auxiliary device and the hand-held host device concurrently 117 or the auxiliary device alone in lieu of the hand-held host device 117. The input accelerator device 100 is communicatively coupled to a hand-held host device 117, such as a cellular phone, PDA, pocket PC, or smart phone, or other similar devices using a communication link 111, such as the Bluetooth protocol. The Bluetooth protocol is a short-range, low-power 1 Mbit/sec wireless network technology operated in the 2.4 GHz band, which is appropriate for use in piconets. A piconet can have a master and up to seven slaves. The master transmits in even time slots, while slaves transmits in odd time slots. The devices in a piconet share a common communication data channel with total capacity of 1 Mbit/sec. Headers and handshaking information are used by Bluetooth devices to strike up a conversation and find each other to connect.

The communication link 111 alternatively may be a wired link using standard data ports such as Universal Serial Bus interface, IEEE 1394 firewire, or other serial or parallel port connections. Additionally, the communication link 111 can be other standard wireless links such as infrared, wireless fidelity (Wi-Fi), or any other wireless connection. Wi-Fi refers to any type of IEEE 802.11 protocol including 802.11 a/b/g. Wi-Fi generally provides wireless connectivity for a device to the Internet or connectivity between devices. Wi-Fi operates in the unlicensed 2.4 GHz radio bands, with an 11 Mbit/sec (802.11b) or 54 Mbit/sec (802.11a) data rate or with products that contain both bands. Infrared refers to light waves of a lower frequency out of range of what a human eye can perceive. Used in most television remote control systems, information is carried between devices via beams of infrared light. The standard infrared system is called infrared data association (IrDA) and is used to connect some computers with peripheral devices in digital mode.

The communication link 111 connects a communication interface 116 of the input accelerator device with a communication interface 118 of the hand-held host device 117. The input accelerator device 100 includes an interface and input system 114 in communication with the communication interface 116. The interface and input system 114 includes input elements (not shown), such as keys, buttons, pressure sensor pads, touch pads, rotary dials, thumb joysticks, linear strip sensors or other actuators associated with one or more sensors that can be manipulated by one or both of a human user's thumbs or fingers. The input elements are selectively mapped to one or more functions of the software applications stored on the host device 100. The mapping or re-mapping of the input elements to one or more functions of the software applications may be accomplished by using one of the techniques disclosed in co-pending U.S. patent application Ser. No. 11/221,412, entitled "A Method of Remapping the Input Elements of a Hand-Held Device," which is incorporated herein in its entirety by reference.

In this implementation, the interface and input assembly 114 is implemented with four input elements, but may be implemented with more or fewer input elements. Upon actuation of an input element, an electrical signal is generated by the input assembly 114. The generated electrical signal is converted into input signals 122, which are transmitted over the communication link 111 to the hand-held host device 117, which receives the input signals 122 through communication interface 118. The input signals 122 are processed by the hand-held host device 117 to execute the software function mapped to the actuated input element. Typically, hand-held host device 117 has a processor (not shown), such as an ARM, OMAP, or other similar processor for processing the input signals and the software applications stored and running thereon.

Figure 2:
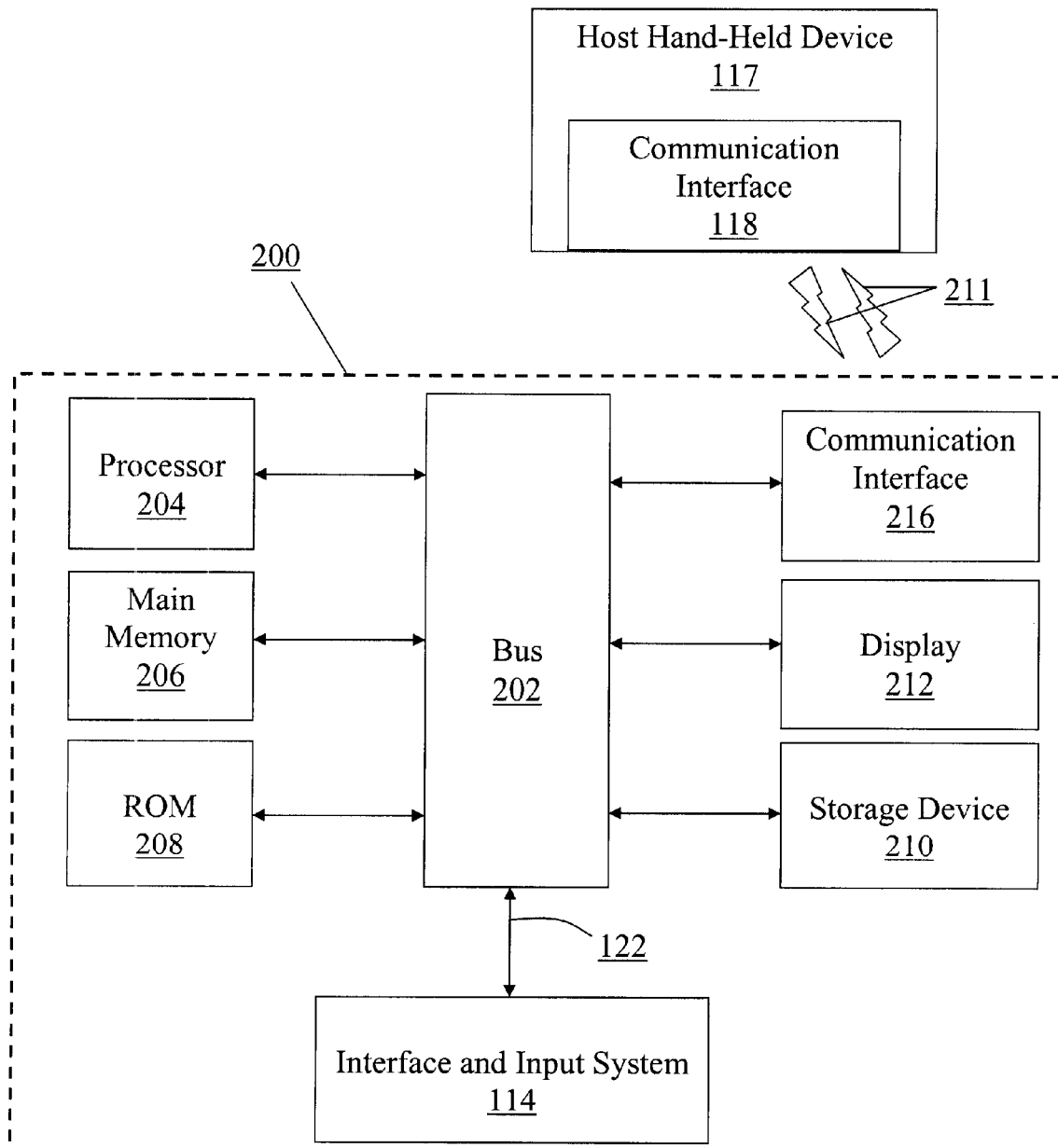
FIG. 2 is another block diagram of a hand-held input accelerator device upon which a human interface and input system may be implemented.

FIG. 2 is a block diagram illustrating an input accelerator device 200 upon which the human interface and input system and associated input techniques described herein may be implemented. In this implementation, optional hardware components are implemented to configure a more powerful auxiliary device to handle more of the processing duties from the hand-held host device 117 onto the input accelerator device 200. The input accelerator device 200 may be used in conjunction with the hand-held host device 117 to control software applications stored and running on the input accelerator device 200 itself. For example, in this implementation, the input accelerator device 200 may have stored and running thereon re-mapping software such as that described in co-pending U.S. patent application Ser. No. 11/221,412. As another example, the input accelerator device 200 may have stored and running thereon an Internet browsing application, which may be used in combination with communication functionality provided with hand-held host devices, such as the cellular communication protocols (e.g., CDMA or GSM/GPRS) provided with cellular phones, to browse the Internet.

The input accelerator device 200 is in wireless (or alternatively wired) communication with the hand-held host device 117. The hand-held host device 117 may include some of the same components as shown for the input accelerator device 200. In this implementation, the hand-held host device 117 is a conventional cellular phone, but other types of hand-held electronic devices may be used with the input accelerator device 200. The input accelerator device 200 may include a bus 202 or other communication mechanism for communicating information, and a processor 204, such as an ARM, OMAP or other similar processor, coupled with bus 202 for processing information, such as one or more sequences of one or more instructions, which may be embedded software, firmware, or software applications for controlling the hand-held host device 117, such as re-mapping software or text, gaming or scrolling applications, or any other software application.

The input accelerator device 200 also may include a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. The input accelerator device 100 further may include a read only memory (ROM) 208 or other static storage device coupled to bus 202 for storing static information and instructions for processor 204. A storage device 210 may be provided and coupled to bus 202 for storing information and instructions for the processor 204. The storage device 210 can include a flash memory such as EEPROM, compact flash, or a similar storage unit for storing device firmware. Upgrades to the firmware can be easily downloaded through the host device. The input accelerator device 200 may also include an optional display 212, such as a liquid crystal display (LCD), for displaying information to a user, and a human interface and input system 114 for communicating information and command selections from a human user to processor 204. The command selections from a human user are communicated as input signals 122 from the interface and input system 114 to the bus 202 for distribution to other components such as the processor 204. Input accelerator device 200 also may include a communication interface 216 coupled to bus 202.

Communication interface 216 provides a two-way data communication 211 coupling to the hand-held host device 117, a wireless service device, or wireless service station. The two-way data communication 211 allows for an exchange of interactive data between the hand-held host device 117 and the input accelerator device 200. The interactive data may include voice data for conducting a conversation using a cellular phone host device. The interactive data may also include a graphical user interface (GUI) for browsing the Internet, which may be displayed on the optional display 212. In this implementation, the cellular phones host device serves as a communication conduit for receiving data from the Internet as previously mentioned. Communication interface 216 may be a wireless link such as Bluetooth or any other wireless communication interface known to one of ordinary skill in the art. In the wireless link implementation, communication interface 216 may send and receive electrical, electromagnetic or optical signals that carry digital data streams representing various types of information.

The input accelerator device 200 also can display a graphical user interface (GUI) on the display unit 212 to provide a list of hand-held host devices 117 within communication range of the input accelerator device 200. The list of hand-held host devices 117 within communication range can be displayed using text names of each device an icon representing each device, or a combination of text name and icon representing each device. The input elements in the input assemblies 406, 408, 409 (described in detail in FIG. 4 below) can be actuated in combination or individually to select a desired hand-held host device 117 from the list of devices in communication range of the input accelerator device 200.

The input accelerator device 100, 200 as described above can obviate the need to remove the hand-held host device 117 from the user's pocket, bag or other storage location by performing most simple text/voice control functions. The input accelerator device 100, 200 may also include a device driver (not shown) to effect control over the host hand-held device 117 and all associated software applications on the hand-held host device 117.

Human Interface and Input System Overview

Figure 3:
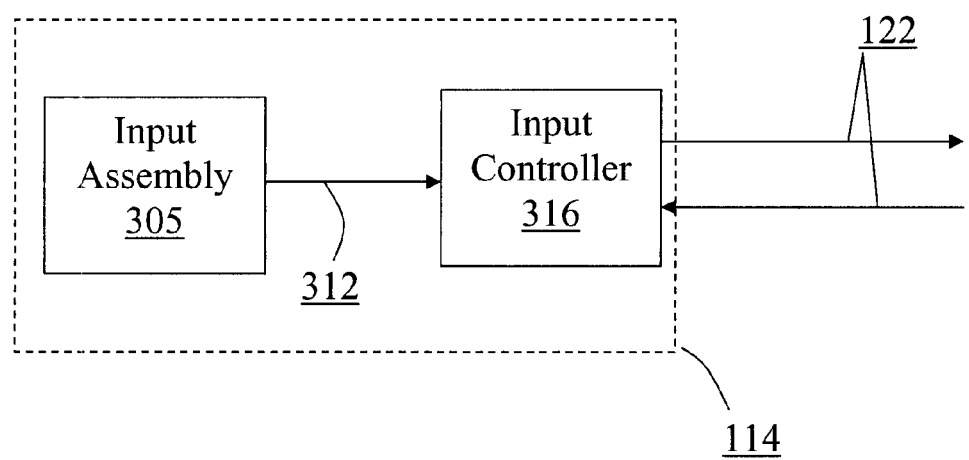
FIG. 3 is a block diagram of a human interface and input system.

FIG. 3 depicts a block diagram of the subsystems of the human interface and input system 114 of the input accelerator device 100 or the input accelerator device 200. The human interface and input system 114, which is described in more detail in co-pending U.S. patent application Ser. No. 10/699,555, entitled "Human Interface System," which is incorporated herein in its entirety by reference, includes an input assembly 305 in communication with an input controller 316 to interpret and generate input signals in response to user interaction with the input assembly 305. The input assembly 305 can include multiple input assemblies (described in detailed below in FIG. 4), each assembly including a number of input elements, located on one or more surfaces of the input accelerator device 100 or the input accelerator device 200. The input elements are selectively mapped to one or more functions of a software application that is stored on the hand-held host device 117 so that when one of the input elements is actuated, the function mapped to the actuated input element is executed.

Specifically, when an input element is actuated, one or more electrical signals 312 are produced, which are received and interpreted by the input controller 316. The input controller 316, which may include one or more processors, receives the one or more electrical signals 312 and converts them into input signals 122 which are transmitted to the hand-held host device 117 via communication link 111 connecting the communication interface 116 of the input accelerator device 100 with the communication interface 118 of the hand-held host device 117. Similarly, the input signals 122 are transmitted to the hand-held host device 117 via communication link 211 connecting the communication interface 216 of the input accelerator device 200 with the communication interface 118 of the hand-held host device 117. In one implementation the hand-held host device 117 interprets the input signals 122 on the fly using software, such as mapping software, to execute the function mapped to the actuated input element. Alternatively, the input accelerator device 200 may interpret the input signals 122 using software stored in the storage unit 210.

Figure 4:
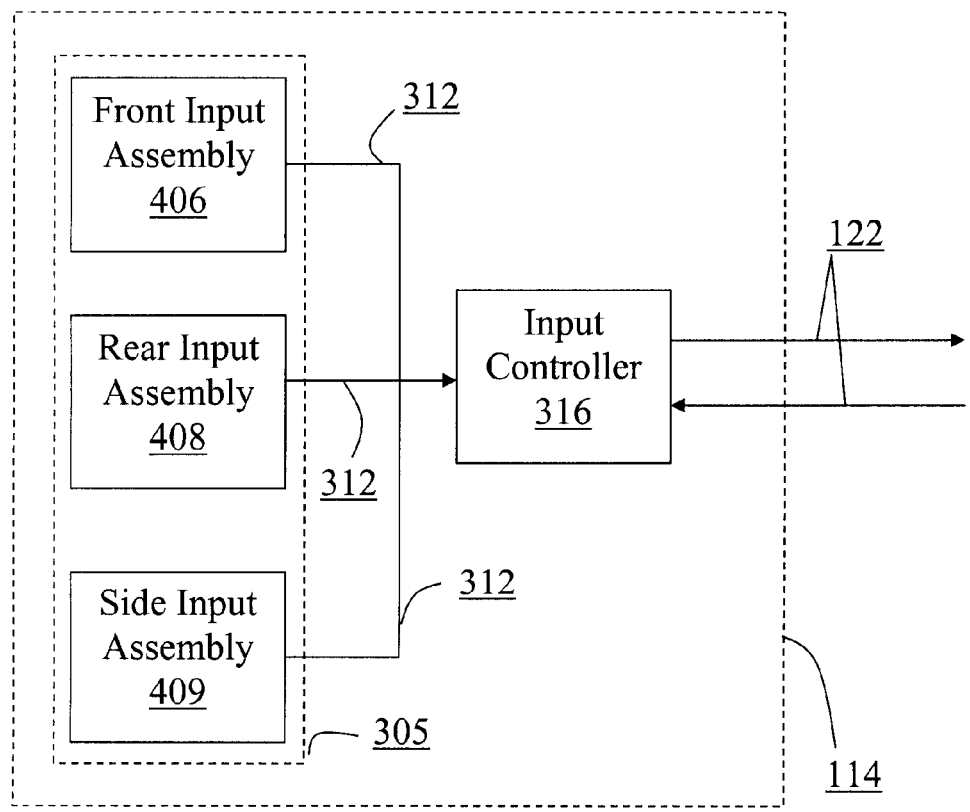
FIG. 4 is a detailed block diagram of the input assembly of the human interface and input system.

FIG. 4 illustrates one implementation of input assembly 305 including multiple input assemblies. The input assembly 305 includes a front input assembly 406, a rear input assembly 408, and a side input assembly 409. The front input assembly 406 and the rear input assembly 408 includes one or more input elements. The input elements produce one or more electrical signals 312 upon actuation of the input elements. The input controller 316, which may include one or more processors, receives the one or more electrical signals 312 and converts them into input signals 122, which are in a form suitable to be received and interpreted by the hand-held host device 117. Alternatively the input signal 122 may be interpreted by the processor 104 on the input accelerator device 200.

The hand-held host device 117 receives the input signals 122 and interprets it using the re-mapping software noted above and described in more detail below, which may be loaded on the host hand-held device. Specifically, the input signals 122 transmitted from the input accelerator device 100, 200 are received by a communication interface 118 on the hand-held host device 117 using standard communications protocols, such as the Bluetooth wireless protocol. The Bluetooth protocol allows the input signals 122 transmitted from the input accelerator device 100, 200 to control execution of embedded software, firmware, or software applications, such as a text messaging or game applications, on the hand-held host device 117. The input signals 122 are received and used by the hand-held host device 117 to map and remap the input elements in the front input assembly 406, the rear input assembly 408 and the side input assembly 409 to one or more software functions of a software application running on the host hand-held device 117.

For example, if a text application is running on the hand-held host device 117, then an input controller (not shown) on the hand-held host device 117 maps one or more input elements on the hand-held host device 117 (e.g., input elements forming the keypad on a cellular phone) to one or more symbols, such as characters, letters, numbers, icons, other types of symbols, or combinations of different types of symbols, and map one or more input elements of the front input assembly 406 on the input accelerator device 100, 200 to a shifting or indexing functionality. Thus, if a user wants to insert the letter "X", the user may press a first shift key on the input accelerator device 100, 200 and then the number key "9" on the hand-held host device 117. If the user wants to insert the letter "Y", the user may press a second shift key on the input accelerator device 100, 200 and then the number key "9" on the hand-held host device 117. The user wants to insert the letter "Z", the user may press a third shift key on the input accelerator device 100,200 and then the number key "9" on the hand-held host device 117 So instead of having to press the number key "9" on the hand-held host device 117 three times to insert the letter "Z", which is the norm on most multi-tap interfaces, the user can insert the same letter with one press of the number key "9" on the hand-held host device 117 in combination with one press of the third shift key on the input accelerator device 100, 200.

Also, one or more input elements of the rear input assembly 408 on the input accelerator device 100, 200 can be mapped to scrolling, navigation, or cursor control functions. Furthermore, one or more input elements of the side input assembly 409 can be mapped as a short-cut key for executing a favorite application on the host hand-held device 117, such as a text, game or music application. If the hand-held host device 117 is executing a game application, then the input signals 122 may be used to control game play. That is, the input controller (not shown) on the hand-held host device 117 may map the input elements of the input assemblies 406, 408, 409 from the input accelerator device 100, 200 to game functions. The mapping of the input elements to particular input functions for a given software application, whether done by an input controller or processor on the hand-held host device 117 in response to the input signals 122 transmitted by the input accelerator device 100, 200, may be customized by the application developer or the user through downloads or other programming modalities. Moreover, the mapping of the input elements may be done for language key set changes, which may reduce the cost of manufacturing hand-held electronic devices for manufacturers servicing multiple countries.

Alternatively, the processor 204 of the input accelerator device 200 may perform the mapping function described above and alleviate some of the processing burden of the hand-held host device 117. Moreover, the human interface and input system 114 need not have the input controller 316, particularly where cost is a concern. In those instances, the processor 204 can directly receive the electrical signal 312 and interpret it into a suitable input signal 122, which is mapped using the mapping techniques noted above and described in more detail below.

The co-pending U.S. patent application Ser. No. 11/221,412, describes techniques to selectively map and re-map the input elements on a hand-held electronic device optimally for a particular class of application software with common requirements (e.g., games, text entry, music and scrolling) and/or for a particular user. These techniques may also be used to map and remap the input elements of the input accelerator device 100, 200 disclosed herein and/or the hand-held host device 117. Alternatively, the input accelerator device 100, 200 may simply transmit the input signals 122 in response to user manipulation of the input elements to the hand-held host device 117, where an application software executing on the hand-held host device 117 interprets the input signals accordingly.

In one implementation, a technique for remapping a hand-held electronic device includes receiving configuration settings, which may include at least one physical input element associated with at least one function, for a software application or a class of software applications; modifying a mapping function based on the configuration settings; and executing the function associated with the physical input element upon an activation, e.g., a press or actuation, of the physical input element during operation of the software application. The activation of the physical input elements may be from the three input assemblies 406, 408, 409 of the input accelerator device and/or the input assemblies of the host hand-held devices. As described above, using standard wireless communication protocols, such as Bluetooth, signals generated from the physical activations of the input assemblies of the input accelerator device 100,200 is transmitted to the hand-held host device 117 to control execution of specific software or software application. And in response to the execution of the software or software application by the signal transmitted from the input accelerator device, mapping and remapping procedures are performed. The mapping function may comprise a keyboard device driver, a device layout or a translation layer of the keyboard device driver, a combination of these or another mapping function.

In an implementation where the mapping function comprises a device layout the step of executing the function associated with the physical input element upon an activation of the physical input element may include writing a scan code to a buffer; retrieving the scan code from the buffer; converting the retrieved scan code to a virtual input element code using the modified device layout; calling a keyboard event with the scan code and the virtual input element code; and executing the function associated with the keyboard event, which is the function associated with the physical input element.

In an implementation where the mapping function comprises a translation layer, the step of executing the function associated with the physical input element upon an activation of the physical input element may include writing a scan code to a buffer; retrieving the scan code from the buffer; converting the scan code to an original virtual input element code; converting the original virtual input element code to a new input element code using the modified translation layer of the keyboard device driver; calling a keyboard event with the scan code and the new virtual input element code; and executing the function associated with the keyboard event, which is the function associated with the physical input element.

In another implementation, a method of re-configuring or re-mapping a software application or class of software applications may include associating one or more physical input elements disposed on the input accelerator device with at least a first executable function; and causing a modification of a mapping function to form an association of the one or more physical input elements with a second executable function to an association of the one or more physical input elements with the first executable function so that the first executable function is configured to be initiated upon an activation of the one or more physical input elements during operation of the software application or the a software application within a class of software applications. The second executable function is typically a default function typically provided with the software application to be executed in the default state when the one or more physical input elements are pressed or activated.

In yet another implementation, a graphical user interface identifying functions that are available to be associated with one or more physical input elements may be provided. The graphical user interface may also identify software applications for which a user can select to apply his physical input element to function associations. In one instance the graphical user interface may include input element icons, which correspond to physical input elements, and function icons, which correspond to an executable function. The user may then specify the functions to associate with physical input elements.

Hand-Held Input Accelerator Device Implementations

FIGS. 5a-d illustrates front, side, back, and "hand-held" views, respectively, of a hand-held input accelerator device 500 upon which the human interface and input system may be implemented. In one implementation, the input accelerator device 500 is implemented as a remote control device including four planar or contoured surfaces: a front surface 502, a back surface 508, a left side surface 504, and a right side surface 306. Although, in other implementations, the input accelerator device 500 may have more or fewer planar and/or contoured surfaces. The input accelerator device 500 may be a miniature standalone wireless accessory device that communicates with a variety of hand-held devices such as a cellular phone, PDA, pocket PC, smart phone, laptop, or other similar devices through a wired or wireless communications protocol, such as the Bluetooth wireless protocol.

Figure 5A:
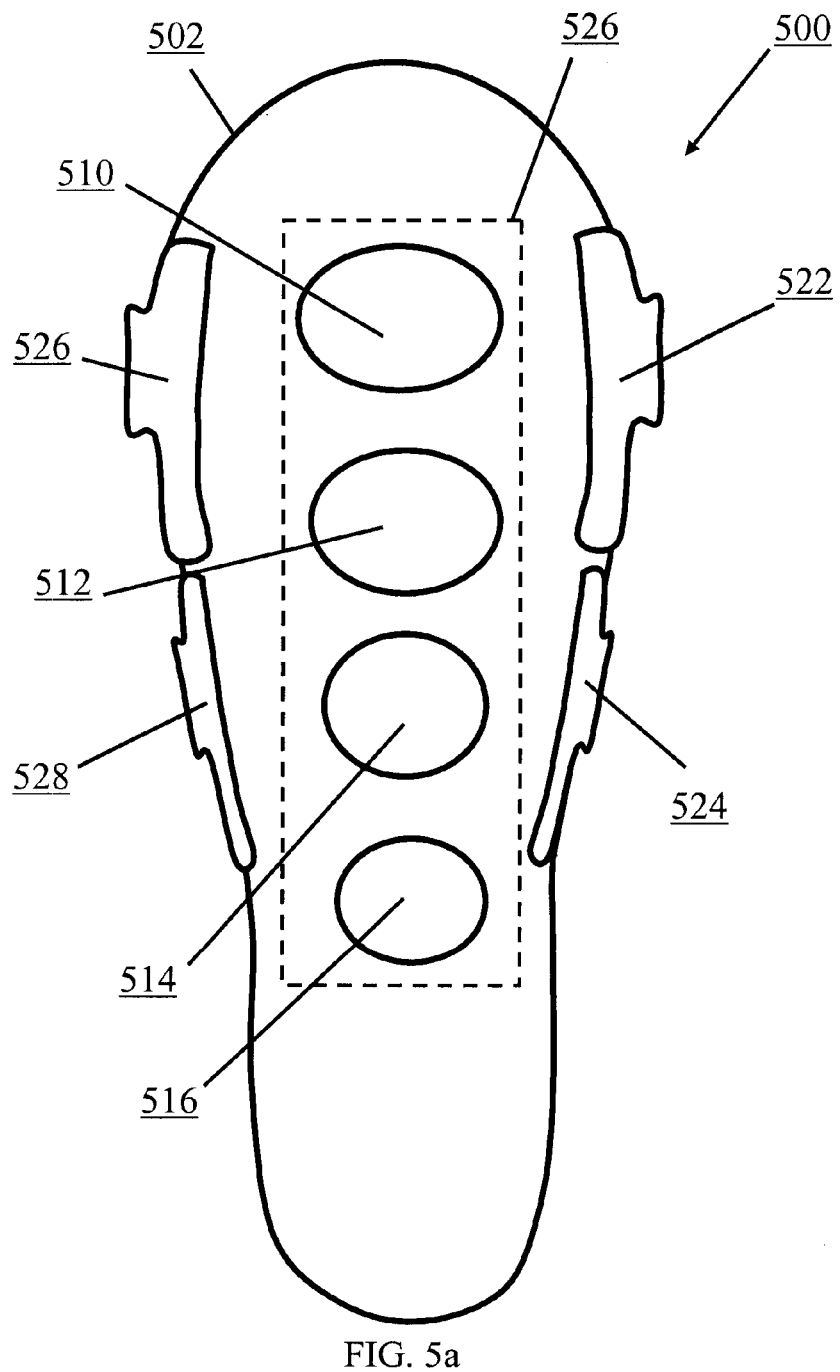
FIGS. 5a, 5b, 5c and 5d show front, side, and back views, respectively, of a hand-held input accelerator device wherein a second input assembly includes a pressure sensor arrays having a plurality of configurable active areas.

As shown in FIG. 5a, on the front surface 502, a display (not shown), such as an LCD, and a front input assembly 526 may be disposed adjacent to each other. Alternatively, the display may be on a separate assembly such as those displays for PDA's and cellular phones with a swivel-mounted screen or flip-phone configurations. Also, the front input assembly 526 may be disposed on more than one surface. The front input assembly 526 may include four input elements 510, 512, 514, and 516, although any number of input elements may be provided, which may be actuated by a user's thumb or fingers. The input elements 510, 512, 514, and 516 may be mapped to function as shift or index keys, such as Shift1 (510), Shift2 (512), Shift3 (514), and Shift4 (516), to facilitate shifting or indexing between symbols, such as characters, letters and/or numbers, associated with input elements on the host electronic device, such as a keypad on a cellular phone or PDA. For example, on a host electronic device, such as a cellular phone, typically a keypad is provided, which has a "7PQRS" key or input element. By using the input accelerator device 500, any one of these symbols—P, Q, R, and S— may be entered by tapping the appropriate input element 510, 512, 514, and 516 and tapping the "7PQRS" key on the host electronic device. That is, the "P" character, e.g., can be entered on the host electronic device by pressing input element 510 (which is mapped as Shift1) and pressing the "7PQRS" key on the host electronic device. Likewise, the Shift2 input element 512 may be pressed with the "7PQRS" key to produce the "Q" character. The Shift3 input element 514 may be pressed with the "7PQRS" key to produce the "R" character. Pressing the "7" key without shift keys can either produce the number "7" or the "P" character depending on user preference, which can be configured in software. The Shift4 input element 516 can be pressed with the "7PQRS" key to produce the "S" character. Thus, the need to tap the same key on the host device multiple times (i.e., three times) to enter, for example the "S" character" is eliminated. The implementation of multiple shift or indexing input elements as described above can dramatically improve the comfort, accuracy and speed of text entry for a variety of host handheld device users.

Figure 5B:
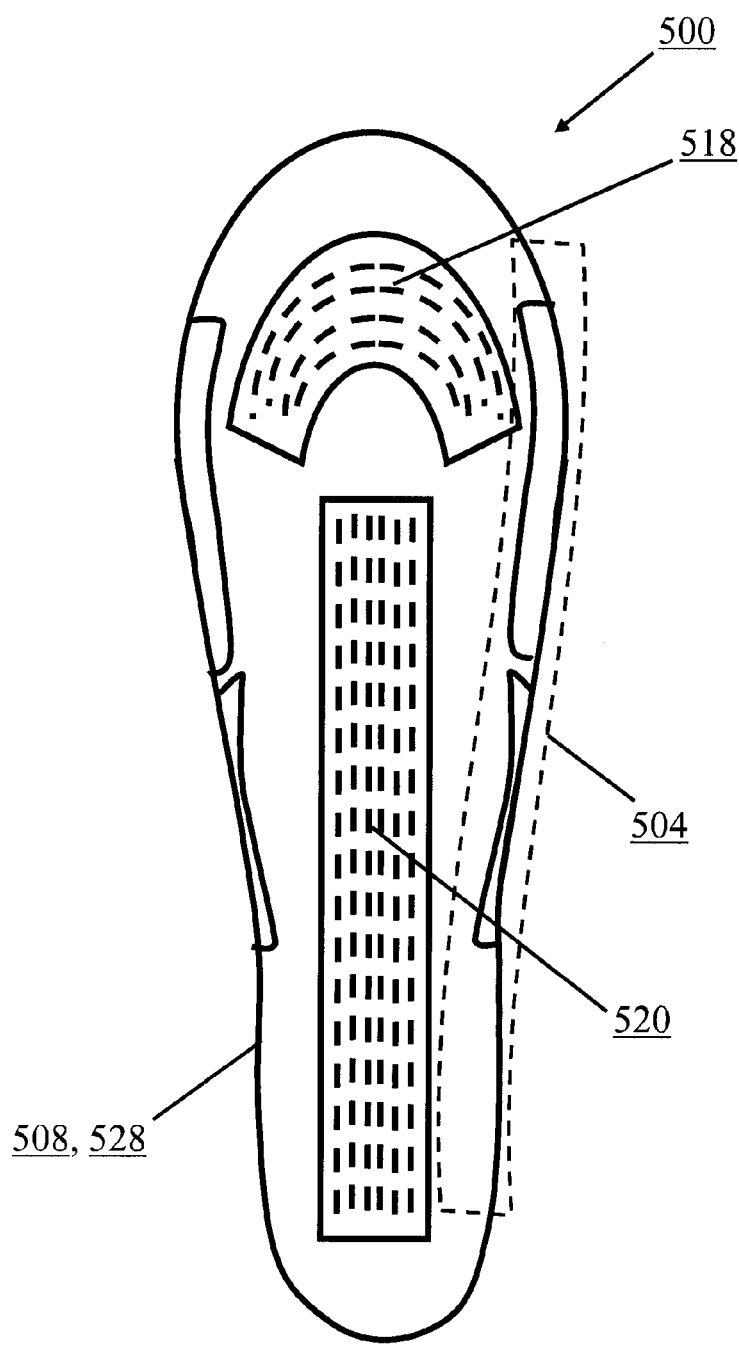

As shown in FIG. 5b, a rear input assembly 528 may be disposed on the back surface 308. In this implementation, the front input assembly 526 (FIG. 5a) is disposed relative to the rear input assembly 528 to take advantage of the opposition of the human thumb and finger. Alternatively, a user may flip over the input accelerator device to use the rear input assembly his thumb instead of his fingers. The rear input assembly 528 may include two sensor arrays configured in software to represent one or more delineated active areas corresponding to deterrent programmable functions depending on the application. The sensor arrays may include a ring-shaped curved sensor array 518 and a strip-shaped linear sensor array 520. The curved sensor array 518 may be implemented to be swept sideways along a natural freedom of motion of a thumb (or finger) to map horizontal cursor movements. In addition, the linear sensor array 520 may be swept vertically using the thumb (or finger) to map vertical cursor movements or control the scroll bar in a long selection list. The curved 518 and linear 520 sensor arrays in this implementation may include an actuator, such as an elastomeric material, attached to a force sensitive resistor array, a capacitive mat or array, or other similar pressure sensitive device or grid that can provide multiple outputs corresponding to the pressure readings of a plurality of active areas on the sensor arrays. In another configuration of the pressure sensor arrays 518, 520, the entire surface of the sensor arrays 518, 520 may be covered by rectangular active areas interspersed between small rectangular inactive areas to achieve any desired number of active areas. Other configurations of the pressure sensor arrays 518, 520 may be realized depending on the requirements of the desired application.

Alternatively, the rear input assembly 528 can be free of sensors and the input elements on the front input surface 502 may be programmed in software to allow the user to stroke the linear sensor array 520 up or down to effect a vertical scrolling motion in list selection. This implementation facilitates the user in navigating through long lists efficiently and effectively without any additional sensors on the back. Additionally, the front 502 or back 508 input surfaces can optionally provide access to a miniature thumb joystick with analog inputs in both left-right and up-down directions. This thumb joystick can provide analog signals to control a game on the mobile phone host device 117.

Figure 5C:
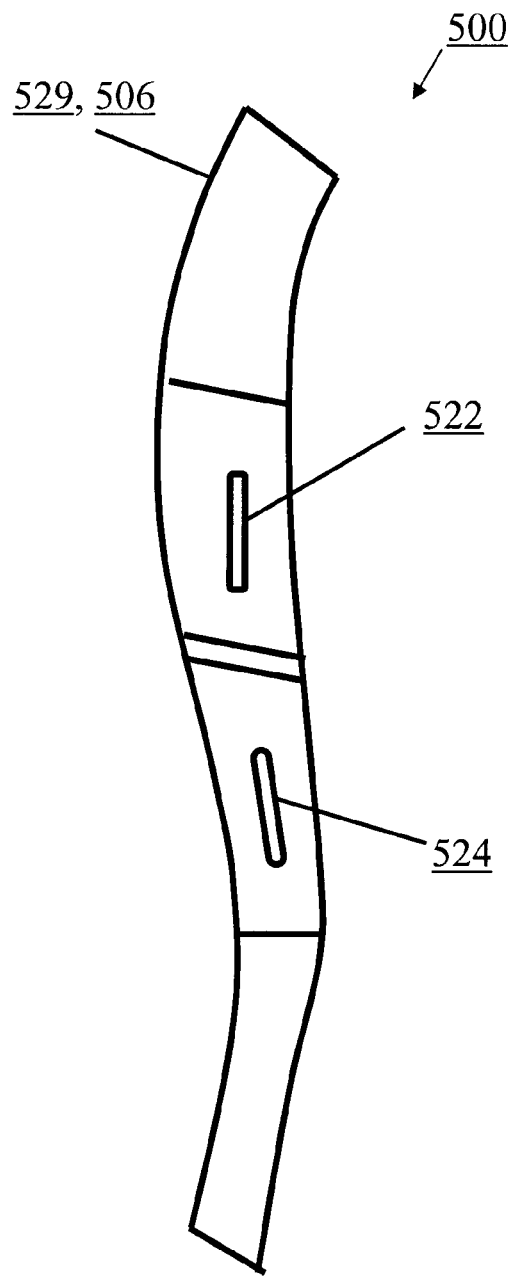
Figure 5D:
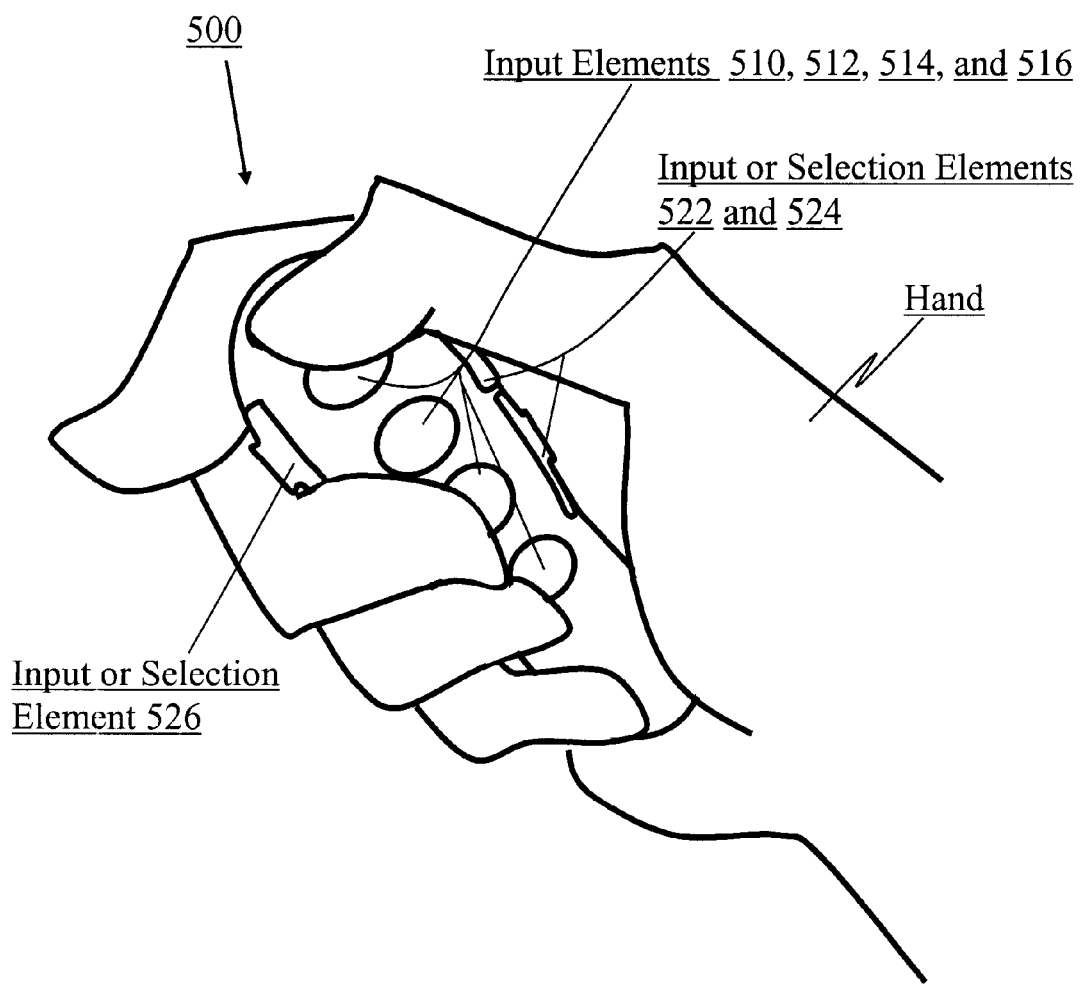

The side input assembly 529 may be disposed on the left-side surface 504 and/or the right-side surface 506 as shown in FIGS. 5a-c. The left side surface 504 and right side surfaces 506 of the input accelerator 300 may be implemented to include additional input or selection elements 522, 524, 526, 528, which may be used to map to other types of cellular phone functions using re-mapping techniques described above and in the co-pending U.S. patent application Ser. No. 11/221,412. The input or selection elements of the side input assembly 529 can also be implemented to effect shifting between modes. For example, holding down one of the input or selection elements 522, 524, 526, 528 may act as a shortcut key whereby a favorite application such as short message service (SMS), instant messenger (IM) or music may be activated. Holding down one of the selection elements may also act as a shortcut key to activate cellular phone functions such as phone number search and select, phone number dial, and call answer Two of the input or selection elements 522, 524 may be implemented for left-handed users and the other two selection elements 526, 528 for right-handed users.

It is to be understood that the input elements 510, 512, 514, 516 of the front input assembly 526, the side input elements 522, 524, 526, 528 of the side input assembly 529, and the back input elements 518, 510 of the rear input assembly 528 in this implementation and any other implementation may be analog and/or digital buttons, keys, rockers (which may be a one or more position buttons or an analog joystick-type button), sliders dials or touch pads used in combination with pressure sensors (such as force sensitive resistors, piezoelectric resistive sensors, and capacitive sensors), positional sensors (such as rotary encoders, linear potentiometers and the like), miniature analog thumb joysticks or other sensors or a combination of them.

Figure 6:
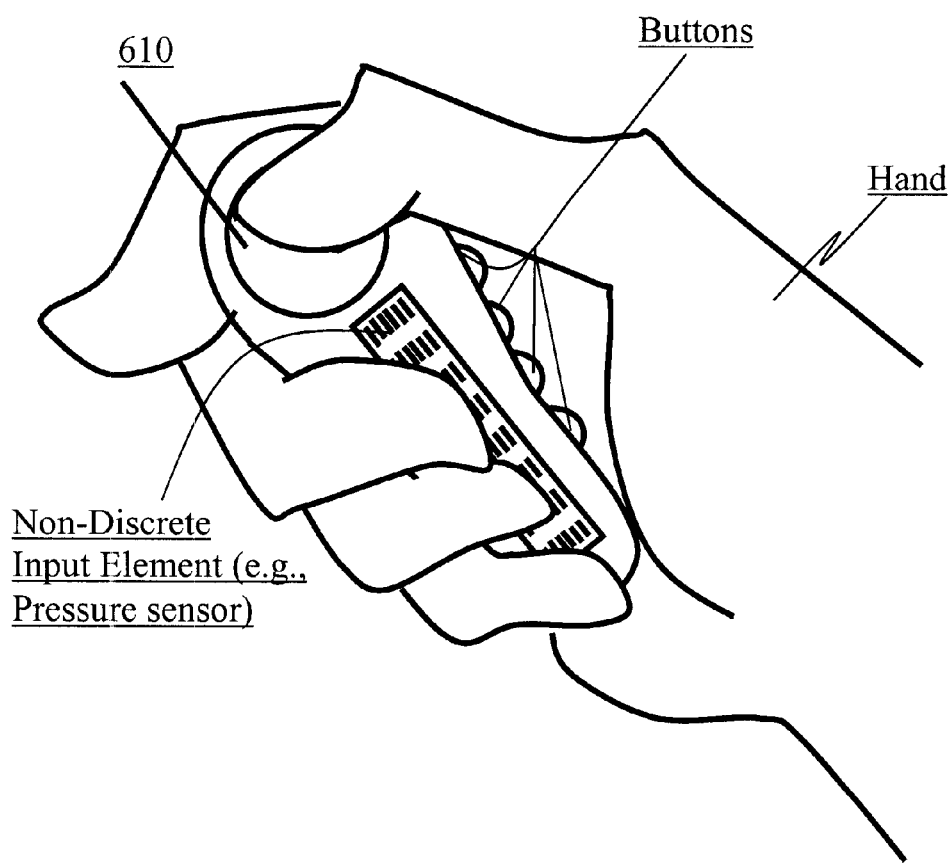
FIG. 6 illustrates an alternate implementation of the second input assembly on a hand-held input accelerator device.

FIG. 6 illustrates an alternative implementation of the rear input assembly 408. Input element 610 is implemented as a conventional rotary dial (such as the Blackberry thumb wheel), which may be used to control horizontal and vertical cursor, scroll, and/or navigation movements. In other implementations, other sensors as described above may be utilized depending upon the user age and application categories to be covered.

Figure 7A:
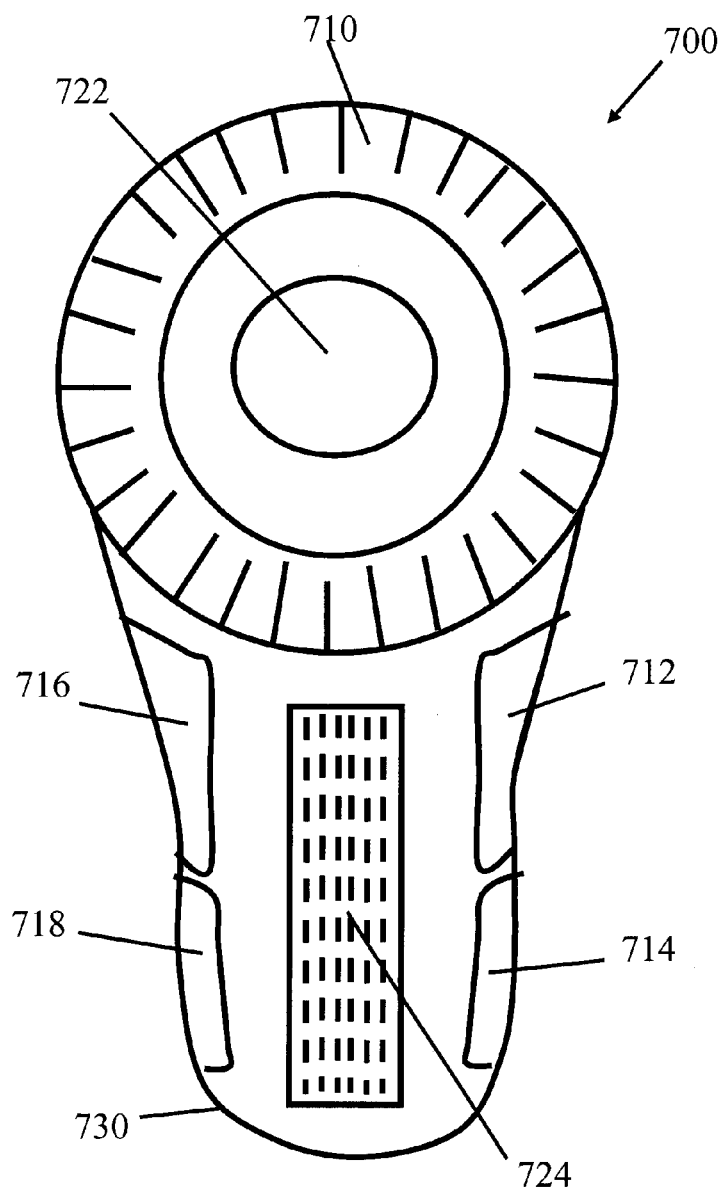
FIGS. 7a, 7b, 7c and 7d depict one implementation of a hand-held input accelerator device comprising a combination of a remote control and a wireless headset.

FIGS. 7a-d illustrates an implementation of the hand-held input accelerator device as a wireless headset. As shown in FIG. 7a, the headset 700 may be implemented to include a thumb wheel as input element 710 on a front surface 730 that allows the user to scroll left and right. The front surface 730 may also include multiple input elements 722, 724, which with the input element 710, comprise a front input assembly. The front input elements 722, 724 may be actuated in conjunction with the input element 710 to perform object selections while scrolling left and right.

Figure 7B:
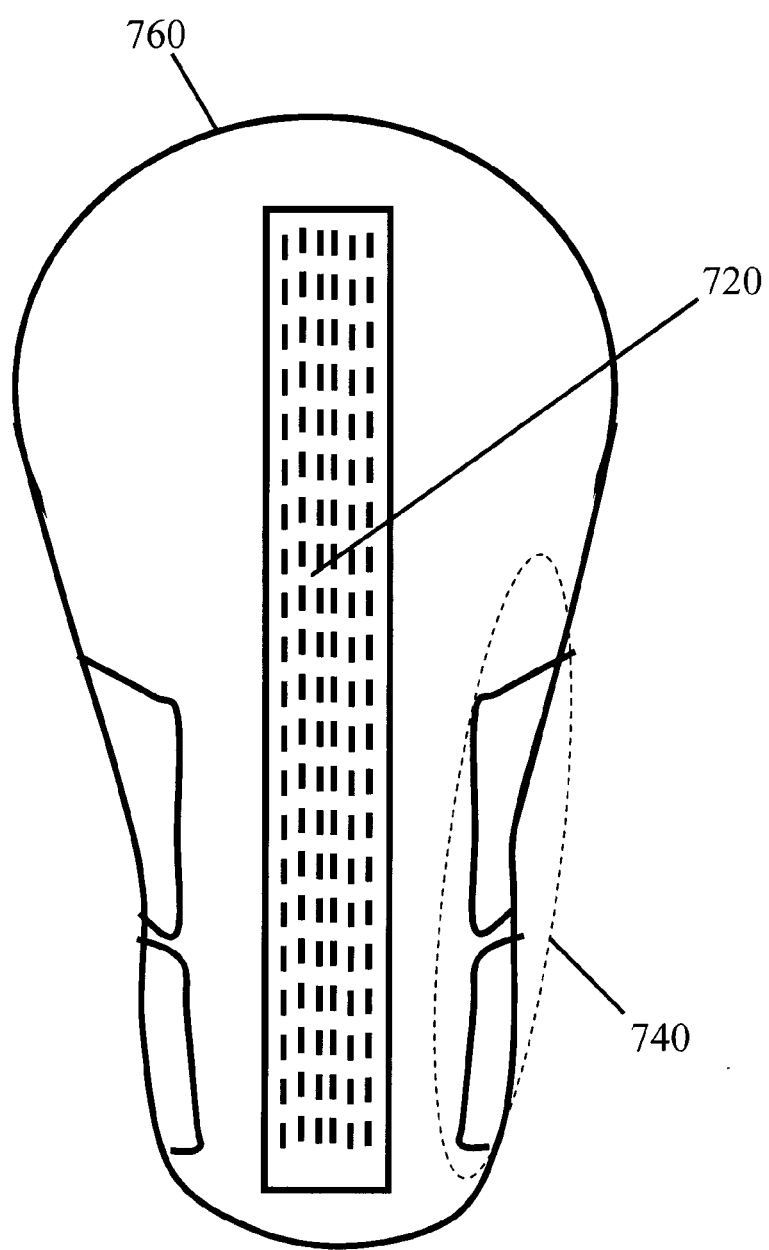

As shown in FIG. 7b, a back surface 760 of the headset 700 represents one implementation of a rear input assembly. The back surface 760 may include a linear sensor array 720 to facilitate vertical scrolling, selection from long lists, and navigation operations. The input elements and active areas on the four surfaces may be substantially similar to those as described above.

Figure 7C:
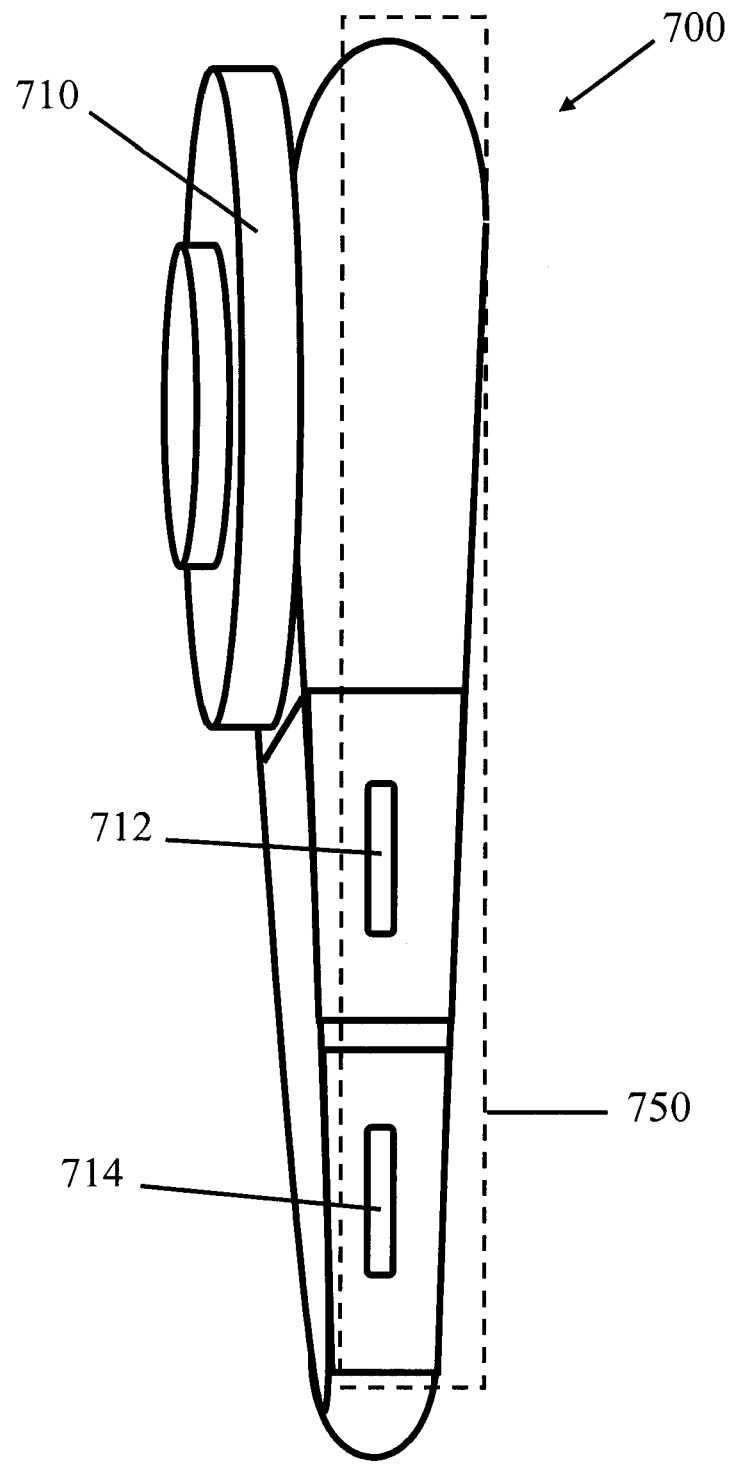

FIGS. 7b and 7c also illustrate a left side surface 740 and a right side surface 750 on which is disposed a side input assembly of the headset 700, which may be configured to include at least four side selection elements 712, 714, 716, 718 to facilitate shifting or indexing between modes and text input. The selection elements may be mapped to shortcuts to variety of functions, such as dialing and answering a call. Two of the selection elements 712, 714 may be implemented for left-handed users and the other two selection elements 716, 718 for right-handed users.

Figure 7D:
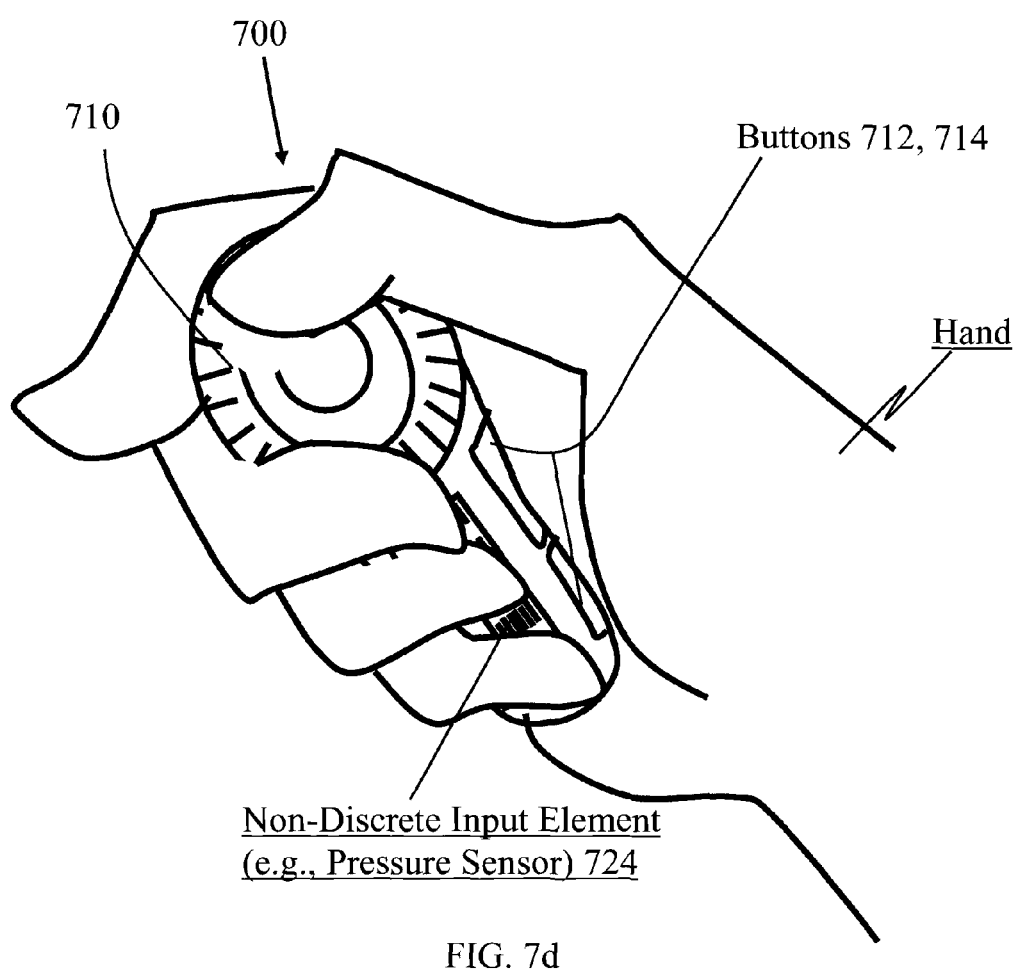

FIG. 7d depicts the headset 700 being used as a remote control. That is, by integrating the remote control inputs into the headset 700, a user can remotely perform all functions of one or more host hand-held electronic devices using just the headset 700 that serves multiple functions. When talking or listening to music on a host device, such as a cellular phone, the headset 700 may be use as a regular headset receiving and transmitting audio signals through a speaker (not shown) and a microphone (not shown). When inputting text, the headset 700 may be held in either or both hands and used to accelerate text entry. When executing applications on host devices, the thumb wheel 710 and the sensor array 720 may be used to navigate and scroll through long lists and icon arrays. Thus, the headset 700 with integrated remote control may be implemented to operate a host device, such as a cellular phone, without ever removing the host device from its storage location (e.g., the user's pocket, jacket, backpack or purse).

A Universal Controller for Toys and Video Games

As described in a co-pending U.S. patent application Ser. No. 11/519,455 (contents of which are incorporated by reference in this application), an accessory or input accelerator device as describe in FIGS. 1-7d above can be implemented to interface with various host devices to control input functions and/or transfer data between the accessory device and the host devices. Data as used in this specification can include productivity software (e.g. word processors, messaging applications, enterprise software etc.), gaming software (e.g. card games, casino games, driving games, first person shooter games, role playing games, etc.), visual content (e.g., wallpaper, pictures, etc.), music files (e.g., MP3 songs, MIDI files, WAV files, ringtones, alerts, etc.), multimedia files (e g., video clips, etc.), address book entries (e.g., names, addresses, numbers, email addresses, etc.), calendar entries, documents (e.g., presentation files, text files, etc.), computer commands, etc. The accessory device can interface with a hand-held host device such as a mobile phone, an ipod, an MP3 player, a PDA, etc. In some implementations, the accessory device can interface with other suitable consumer electronics host devices such as a satellite radio, a lap top, a desk top computer, a video game console, a television, a DVD player, and/or a stereo system.

Figure 8:
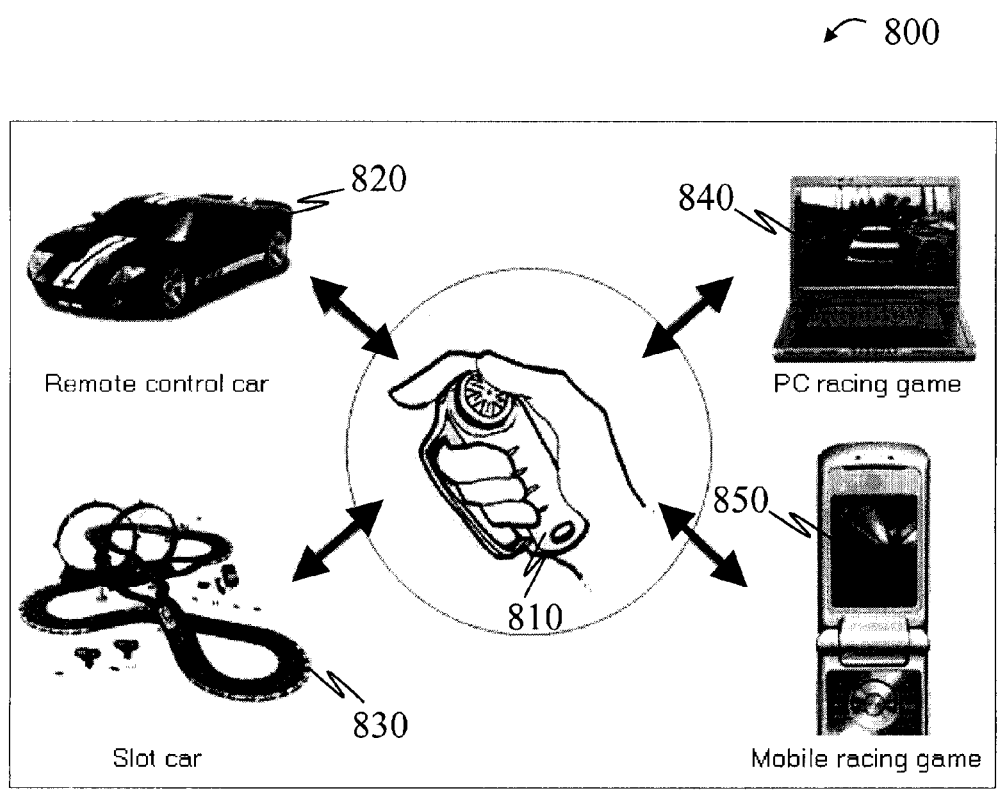
FIG. 8 is a block diagram of a universal controller implementation of the input accelerator device designed to interface with various toys and games, etc.

In one aspect, an accessory device as describe in FIGS. 1-7d is implemented as an universal controller for interfacing with various gaming devices. A gaming device can include a variety of toys, games and video games of various platforms. FIG. 8 is a block diagram showing a universal controller 810 communicatively coupled or interfacedwith a remote-control car 820, a remote-control slot car 820, a personal computer (PC) racing game 830 and a mobile device racing game 840. In some implementations, the universal controller 810 can interface with other toys, games, video games, etc. For example, a video game can include a PC video game and a console video game (e.g., PlayStation®, X-Box®, Nintendo® Wii®, etc.) A toy can further include a remote controlled robot, remote controlled animals, a remote controlled doll, etc. The universal controller 810 is designed to interface with the various toys, games and video games to control their functions and operations. For example, the universal controller 810 can control the driving functions of the remote controlled car 820 and also the PC driving game 840. In addition to controlling various games, toys, video games across different platforms (e.g., a remote controlled toy, a PC video game, a console video game, etc.), the universal controller is designed to transport the gaming experience of a toy, game, etc. from one platform to another.

Figure 9B:
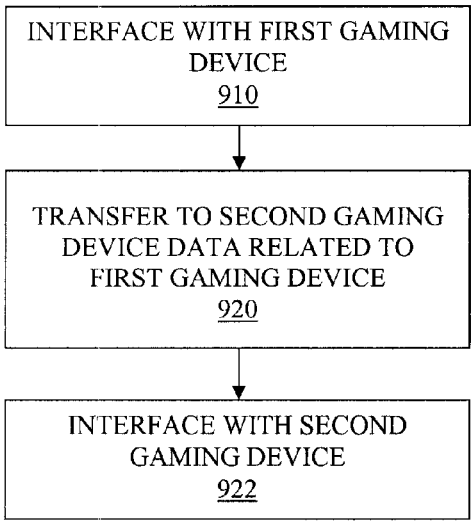
Figure 9B:
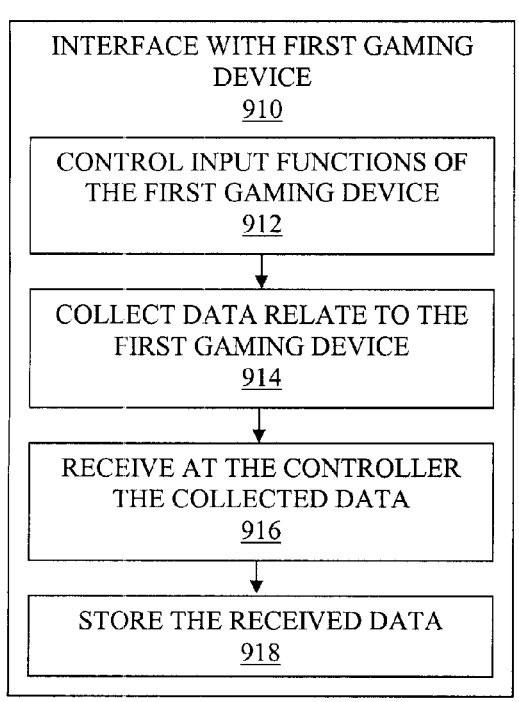
Figure 9C:
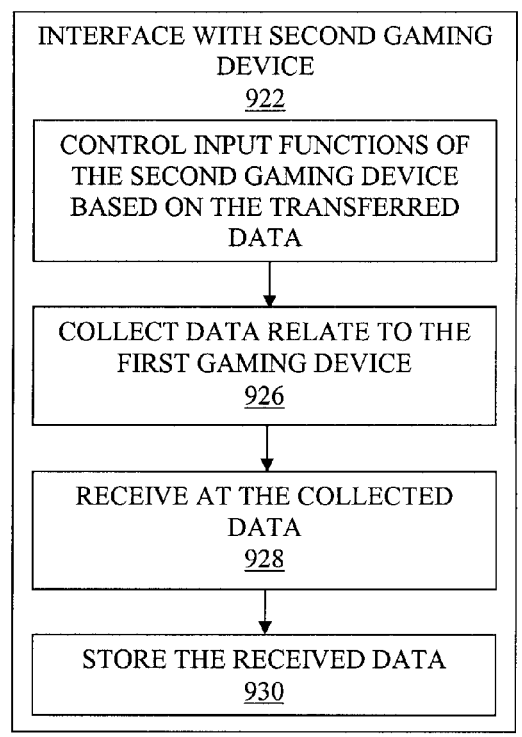

FIGS. 9a-c depict a process flow diagram illustrating a process 900 of controlling functions of various host gaming devices and transferring data related to the host gaming devices between the host gaming devices using, e.g., an input accelerator device, such as the universal controller 810. Data related to the host gaming devices includes data that correlates to the gaming experience for each of the host gaming devices. At step 910, the universal controller 810, e.g., interfaces with a first gaming device at 910, such as a remote controlled car 820 as shown in FIG. 8. The step 910, may itself include several sub-steps. For example, as shown in FIG. 9b, step 910 may include steps 912, 914, 916, and 918. At 912, input functions of the first gaming device are controlled. . For example, as shown in FIG. 8, the universal controller 810 is configured to control the input functions of the remote controlled car 820, such as driving characteristics (e.g., steering, accelerating and braking), or any other input functions that the original remote controller for the remote controlled car 820 can control. Next, at 914, data related to the first gaming device is collected. For example, as shown in FIG. 8, such data can include data related to the usage of the remote controlled car 820. That is, a remote controlled car, such as 820, has a finite battery power, which usually translates to a finite usage time. A timer can be initiated to track the usage time and thus predict when the battery will need recharging or replacing. Usage of other wear and tear components of the remote controlled car 820 can be tracked in similar fashion. For the remote controlled slot car 830, e.g., the number of laps finished by the slot car 830 can be tracked to determine when replaceable parts (e.g., tires) need to be replaced. In some implementations, the data related to the first gaming device can include data related to the performance of the gaming device. For example, performance of the remote controlled slot car 830 can be tracked. Performance data includes the number of laps finished, the lap speed, top speed, etc. Similarly, performance data from the PC racing game 840 or the mobile racing game 850 can be tracked and collected. Next, at 916, the collected data is received. Then at 918, the received data is stored in memory or cache, for example. With reference to FIG. 8, the universal controller 810 receives and then stores the collected data. In some implementations, the data collected is received and stored at the gaming device itself. For example, with reference to FIG. 8, the PC racing game 840 and the mobile racing game 850 may collect and store the performance data as a part of the game. In such implementations, the collected data is transferred from the gaming device to the universal controller 810.

With reference back to FIG. 9*a*, at step 920, data related to the first gaming device, such as dated related to the gaming experience, is transferred to a second gaming device. For example, the data related to the gaming experience of the remote controlled slot car 830 can be transferred to the PC racing game 840. The top speed, lap time, lap speed, etc. can be transferred to the PC racing game 840 to customize a car in the PC racing game. Alternatively, the gaming experience data of the remote controlled slot car 840 can be transferred to the PC racing game to be listed in a leader board for competing against other users. In such implementations, the gaming experience of a tangible toy (e.g., remote controlled slot car 930) is transferred to a virtual toy or game such as the PC racing game 840. The reverse is also possible. For example, data related to gaming experience of a PC racing game 840 can be transferred to a tangible toy, such as the remote controlled slot game 830. In some implementations, a video game with characters (e.g., SIM® or Civilization®) that can be trained is the first gaming device, which is interfaced with the universal controller 810. As a character in the video game is trained, evolves, grows, etc., the character data can be collected and transferred to a tangible remote controlled robot, doll, animal, etc. (e.g., the second gaming device) that corresponds to the character in the first gaming device. Thus, the tangible toy is customized using data related to the gaming experience from a virtual game (e.g., the video game).

Next, at step 922, the universal controller 810, e.g., interfaces with a second gaming device. The step 922, may itself include several sub-steps. For example, as shown in FIG. 9*c*, step 922 may include steps 924, 926, 928, and 930. In other words, interfacing with the second gaming device is similar to interfacing with the first gaming device. At 924, input functions associated with a gaming experience of the second gaming device are controlled using the universal controller 810. In some implementations, the input functions of the second gaming device are controlled based on the transferred data related to the first gaming device. Next, at 926, data related to the second gaming device, e.g., data related the a gaming experience of the second gaming device is collected, and, then, at 928, the collected data is stored in memory or cache, for example. Similar to steps 914, 916 and 918, the data related to the gaming experience of the second gaming device are collected, received and stored at the universal controller. In some implementations, the data is collected, received and stored at the second gaming device (e.g., the second gaming device may be capable of collecting gaming experience data as a part of the game.)

Figure 10A:
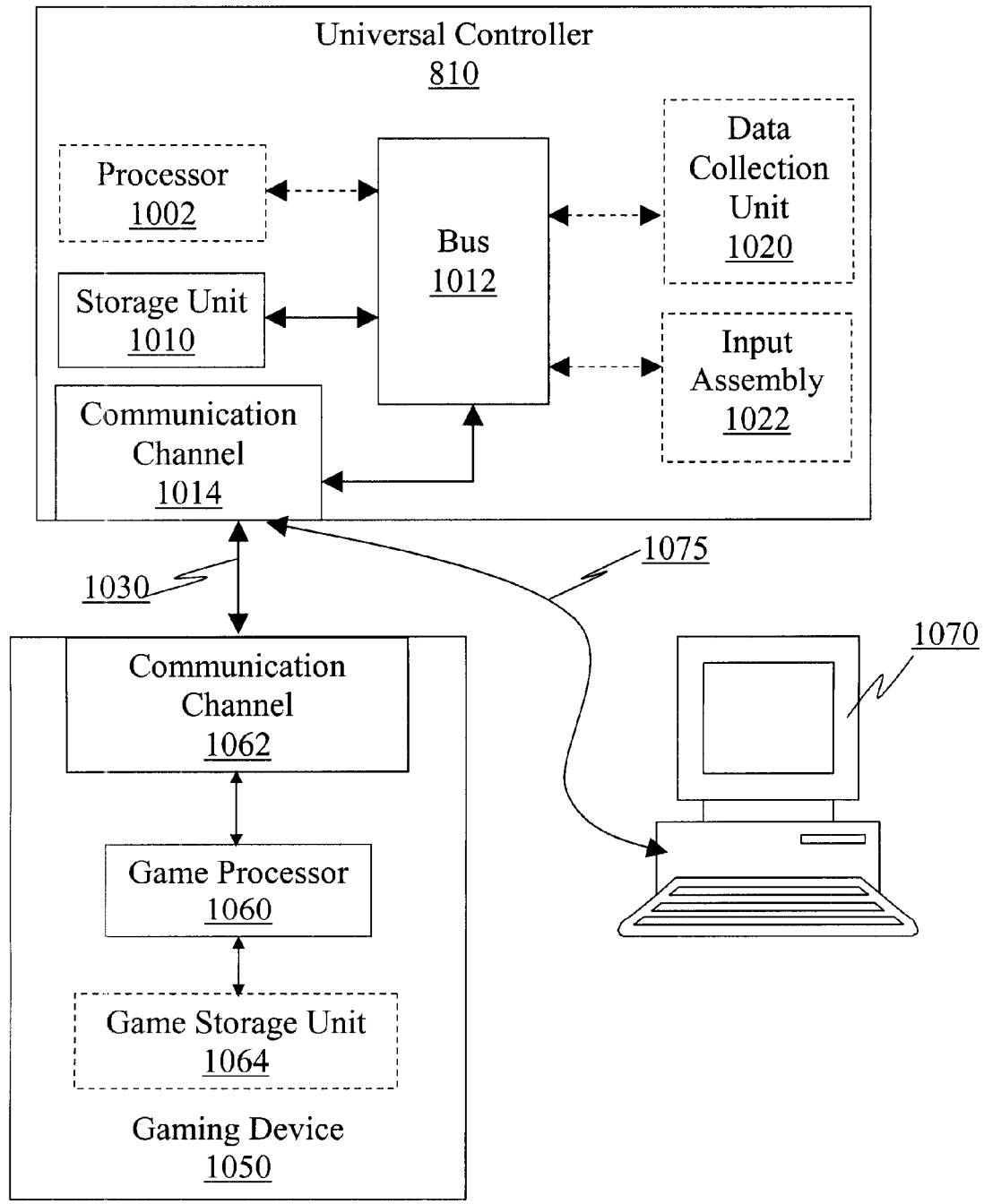
FIG. 10a is a functional block diagram of a universal controller implementation of the input accelerator device designed to interface with a first and a second gaming device.

FIG. 10*a* is a functional block diagram of a universal controller 810 for interfacing with various gaming devices, such as device 1050. Similar to the input accelerators 100 and 200, as described with respect to FIGS. 1-4 above, the universal controller 810 includes a storage unit 1010 and a communication channel 1014 communicatively coupled through a bus 1012 or other appropriate interconnect. The universal controller 810 also includes an optional data collection unit 1020, and/or an optional processor 1002 communicatively connected to the storage unit 1010 and the communication channel 1014 through the bus 1012. The optional processor 1012 and/or the optional data collection unit 1020 controls the input assembly unit 1022 and the output unit 1024 to allow input and output of data. The optional processor 1012 and/or the data collection unit 1020 also manages data connection and transfer through the communication channel 1014. The optional processor 1002 can be implemented as various processors such as an ARM, OMAP or other similar processor, coupled with bus 1012 for processing information, such as one or more sequences of one or more instructions, which may be embedded software, firmware, or software applications for controlling universal controller device 810, such as input or gaming applications, or any other software application. The optional data collection unit 1020 can be implemented as a processor (e.g., ARM, OMAP) or a storage device (e.g., RAM, ROM, flash memory such as EEPROM, compact flash, or a similar storage unit for storing information such as data collected from gaming devices.)

In some implementations, the processor 1002 can perform the functions of the data collection unit 1020 and vice versa. The universal controller 810 further include an input assembly unit 1022. The input assembly unit 1022 is designed substantially similar to the input assemblies 305 described with respect to FIGS. 3-7*d*. Input assembly unit 1022 can include generic input elements for navigation and operation of a gaming device 1050, for example a directional pad for controlling movement of the gaming device. Alternatively, input assembly unit 1022 can be custom designed for specific gaming device, for example a joystick for controlling movements of the remote controlled car 820.

The gaming device 1050 includes a game processor 1060, a communication channel 1062, and an optional game storage unit 1064. The game processor 1060 can be implemented using any one of various processors such as ARM and OMAP. The gaming processor interfaces with the communication channel 1062 to interface with the universal controller 810 via the communication channel 1014 residing in the universal controller. The optional game storage can include one or more of various storage devices such as RAM, ROM, flash memory such as EEPROM, compact flash, or a similar storage unit for storing information such as data collected from the gaming devices 1050.

The universal controller 810 interfaces with the gaming device 1050 by initiating a data link through the two communication channels 1014 and 1062. The communication channels 1014 and 1062 can be compatible with various wired or wireless communication media 1030 as described with respect to FIGS. 1-4 above. For example, a wired connection can include a USB, firewire, serial port, parallel port, and audio jack connections. The wired connection can be achieved with a separate data cable (not shown) connecting the universal controller 810 with the gaming device 1050. For example, a USB cable may be used for devices supporting USB connectivity. Alternatively, the wired connection can be achieved by directly plugging the gaming device 1050 into a compatible data input/output port (not shown) on the universal controller 810. For example, if the universal controller 810 has a mini-USB port, the gaming device 1050 can feature a male mini USB plug that interfaces directly with the gaming device's mini USB receptacle. Other hardware connections such as flexures or snap fit elements may be used to further secure the universal controller 810 to the gaming device 1050 in addition to the plug-in data connection. An adaptor (not shown) may be supplied to allow one type of data connector (either attached to a data cable (not shown) or integrated with the universal controller 810) to plug into a variety of adaptors on the gaming device 1050. A wireless connection can be implemented as a WiFi, a Bluetooth, a WiMax, or an IR connection, or some combination of the above. The communication channel 1014 is capable of establishing a bidirectional data connection between the universal controller 810 and the gaming device 1050. This data connection allows the communication channel 1014 to transmit information bidirectionally between the universal controller 810 and the gaming device 1050. Similarly, the universal controller is designed to interface with additional gaming devices 1070 through communication media 1075.

The data collection unit 1020 is designed to download or receive data from the gaming devices 1050 and 1070. The data collection unit 1020 can be instructed by, e.g., processor 1002, to collect and download selected data related to the gaming experience of the gaming devices 1050 and 1070 in response to a user interaction with one or more input elements of the gaming devices 1050 and 1070. The collected data is stored in the storage unit 1010.

Figure 10B:
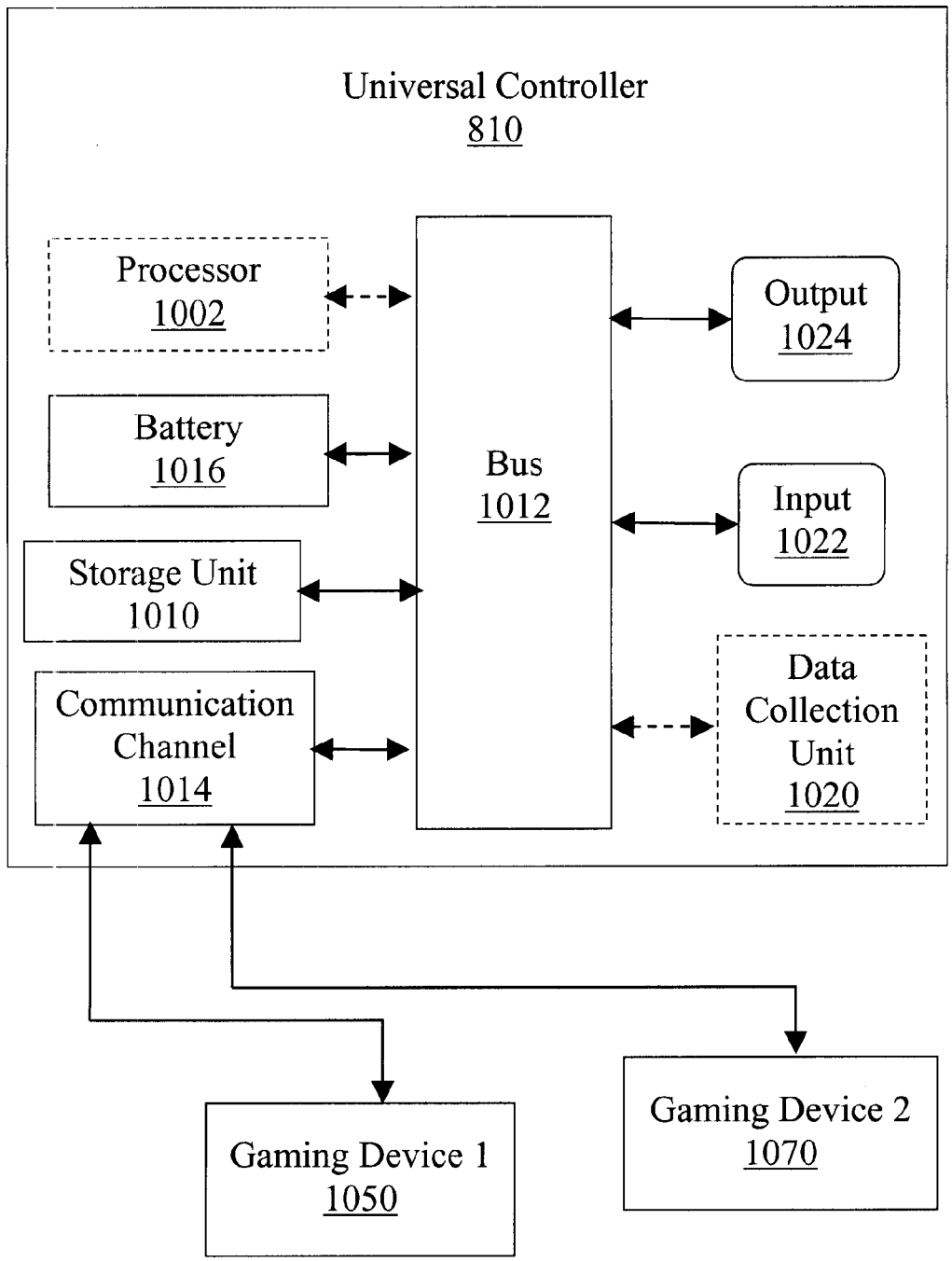
FIG. 10b is a functional block diagram of a universal controller implementation of the input accelerator device showing optional components.

In some implementations, the universal controller 810 is designed to perform additional functions. FIG. 10b depicts the universal controller 810 as including an optional processor 1012, a storage unit 1010, a communication channel 1014, a data collection unit 1020 and an input assembly unit 1022. The universal controller also includes a battery 1016 and an output unit 1024. The optional processor 1012 and/or the data collection unit 1020 controls the input assembly unit 1022 and the output unit 1024 to allow input and output of data. The optional processor 1012 and/or the data collection unit 1020 also manages data connection and transfer through the communication channel 1014. The input assembly unit 1022 is designed substantially similar to the input assemblies 305 described with respect to FIGS. 3-7d. The input assembly unit 1022 can include tangible input elements, such as a button, a touch pad, etc. An output unit 1024 can include a display unit and LEDs. One or more batteries 1016 can be used to power the universal controller 810. The storage unit 1010 can include a memory module, such as a hard drive or a flash ROM, or a removable storage unit (e.g., a compact flash card) for storing the data on board. The storage unit 1010 can store data related to the gaming experience of the gaming devices 1050 and 1070. In addition, the storage unit 1010 can also store one or more computer executable instructions (e.g., an application program) to be executed by the optional processor 1012. The communication channel 1014 can be compatible with wired or wireless protocols similar to those described with respect to the communication channel 1014 in FIG. 10A.

Transferring data between the universal controller 810 and the gaming devices 1050 and 1070 is accomplished with minimum input from the user. For example, a single button or any other suitable user selectable input element (included in the input assembly unit 1022) on the universal controller 810 is mapped to a function designed to establish a data link between the universal controller 810 and the gaming devices 1050 and 1070 to prepare them for data transfer. This function for transferring data between universal controller 810 and the gaming devices 1050 and 1070 can include various other functions that are necessary to establish a communication link and transfer data. For example, one or more communication-related applications can be called and executed to (1) identify the available communication protocol on the gaming devices 1050 and 1070 and ping gaming devices 1050 and 1070; (2) open a communication link; (3) determine system properties of the gaming devices 1050 and 1070; (4) identify the appropriate version of the selected data; (5) transmit the selected data; and (6) verify the transmission. In some implementations, this can be accomplished by initiating a conventional Bluetooth communication link.

Figures 11A, 11B:
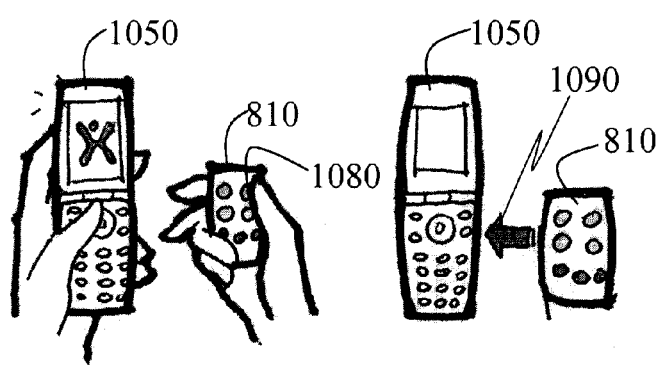
FIGS. 11a and 11b are a block diagrams of a universal controller implementation of the input accelerator device designed to interface with a mobile gaming device.

Mapping the functions to the user input elements of the input assembly unit 1022 can be accomplished using the mapping techniques as described with reference to FIGS. 1-7 above. FIG. 11 illustrates one implementation of the universal controller 810 with one or more user input elements (e.g., buttons) 1080. When a user activates a button 1080 that is mapped to a function for transferring data, a communication link 1090 is established or transferring data between the devices. The universal controller 810 can be implemented as one of various form factors as described in the co-pending U.S. patent application Ser. No. 11/519,455.

Example pseudo code for transferring data between the universal controller 810 and the gaming devices 1050 may be as follows:
Establish a data connection with a gaming device;
Optionally query the gaming device for system properties;
For each unit of data to be delivered,
  Choose the proper format compatible with the gaming device,
  Send the data to the desired destination location on the gaming device, and
  Continue until all data is delivered
For an implementation with Bluetooth wireless connectivity, the pseudo code for establishing a data connection with a gaming device may be as follows:
Discover all Bluetooth devices within range during a user specified amount of time;
For every Bluetooth device in range,
  Request to pair with the device,
  Send the pairing code,
  Wait for pairing response,
  If timed out, continue to next device in range;
  If device responds with correct pairing code, complete pairing, exit loop
Subsequent to successful pairing with a Bluetooth implementation, the desired data may be delivered via a variety of standard Bluetooth protocols, such as Object Exchange (OBEX)—Object Push Profile (OPP), File Transfer Profile (FTP) or the like.

Figure 12A:
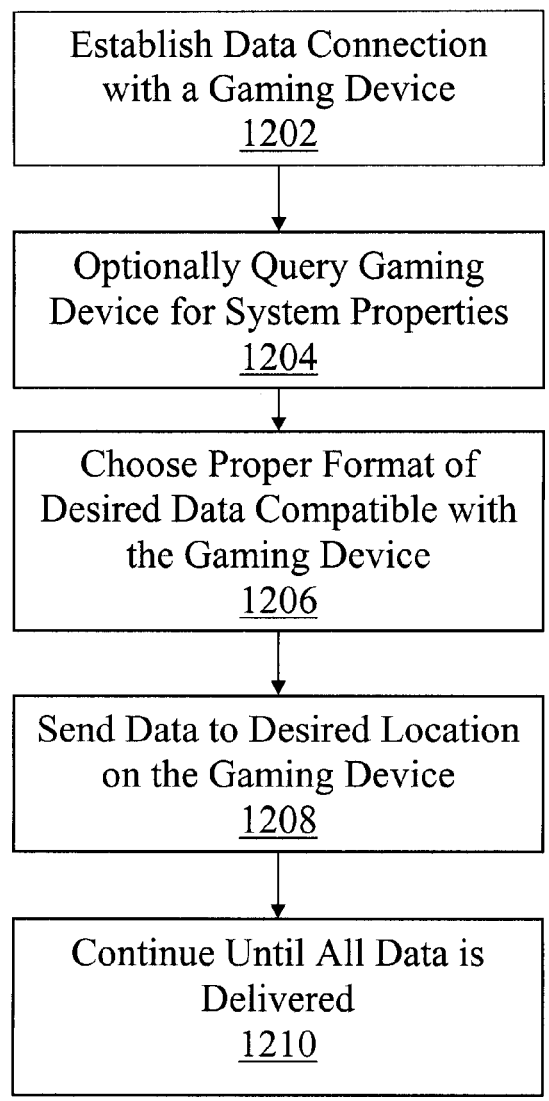
FIG. 12a is a process flow diagram describing a technique for transferring data to one or more gaming devices.

FIG. 12a is a process flow diagram describing a technique for transferring data between the universal controller 810 and one or more gaming devices 1050 and 1070. Data connection is established between the universal controller 810 one or more gaming devices 1050 and 1070. The one or more gaming devices are optionally queried to obtain system properties at 1204. Based on the obtained system properties of the one or more gaming devices, a proper format for desired data to be transferred to the one or more gaming devices are chosen at 1206. The desired data in the chosen format is transferred to a desired location on the gaming device at 1208. The data transfer continues at 1210 until all desired data have been transferred to the one or more gaming devices.

Figure 12B:
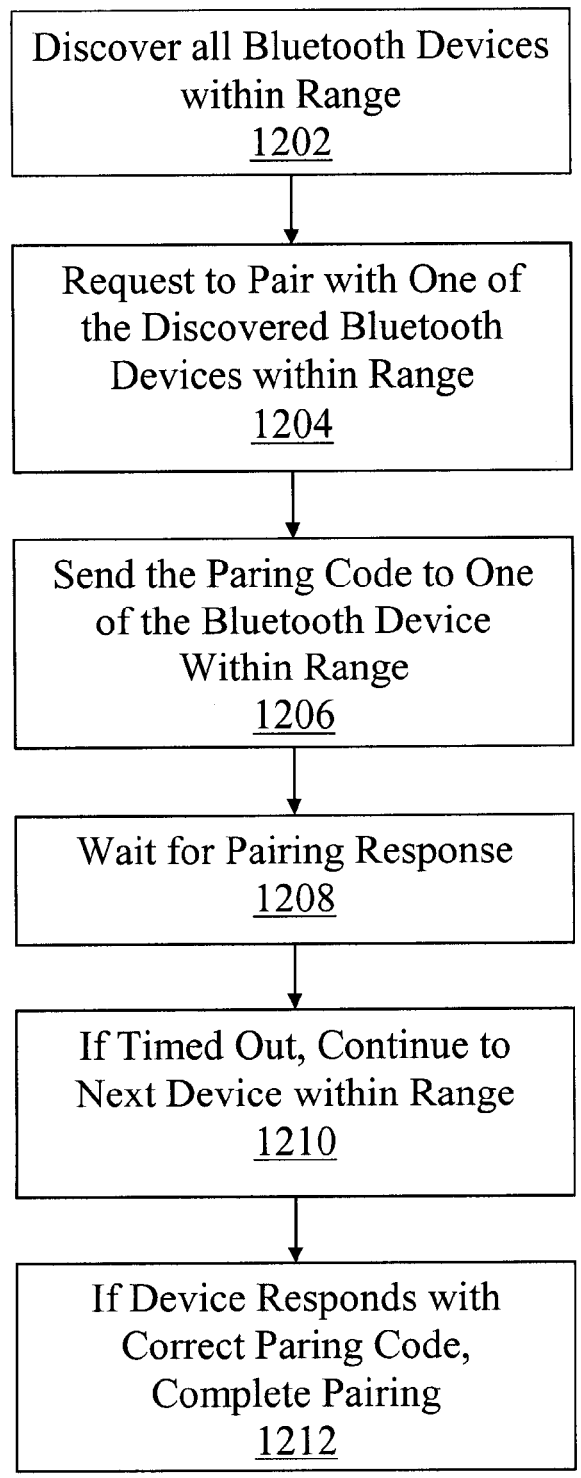
FIG. 12b is a process flow diagram describing a technique for interfacing with a Bluetooth device.

FIG. 12*b* is a process flow diagram describing a techniques for transferring data between the universal controller 810 and one or more gaming devices 1050 and 1070 using Bluetooth wireless connectivity. At 1202, a discovery request is sent out to discover all Bluetooth devices (e.g., Bluetooth gaming devices) within range of the universal controller 810. A request to pair with one of the discovered Bluetooth devices within range is sent at 1204. Pairing code is sent to one of the Bluetooth devices discovered to be within range at 1206. A user waits for a pairing response to the sent pairing code at 1208. If timed out without receiving the pairing response, a request to pair is sent to another device that has been discovered as being within range of the universal controller at 1210. If the Bluetooth device responds with correct pairing code, the pairing is completed at 1212.

In some implementations, the optional processor (e.g., 1002 in FIGS. 10*a-b*) included in the universal controller is designed to determine whether the data related to the gaming experience of the gaming devices 1050 and 1070 should be collected, stored and transferred as described with respect to FIGS. 9*a-c* above. In addition, the optional process 1002 is designed to determined whether to execute a game application (e.g., the mobile racing game 850) on the universal controller 810 or on the gaming device 1050 and 1070 (e.g., a mobile device.) In making the determination, the optional processor 1002 considers various factors. For example, the optional processor 1002 determines the most efficient computing resource allocation based on the number of applications already running on the gaming device 1050 and 1070. This may include communicating with the game processor 1060 on the gaming device 1050. If the optional process or 1002 determines that the game application should be executed on the gaming device 1050, then the game application is executed immediately on the gaming device 1050. Otherwise, the game application is executed on the universal controller 810. In such implementations, a communication channel (e.g., 1014) transmits data related to the executed game application to the universal controller 810. The output of the gaming application is displayed using the output unit 1024.

In some implementations, only the output is displayed on the gaming device 1050. For example, the streaming video and audio data of the game application executing on the universal controller 810 is transmitted to the gaming device 1050 to be displayed on a gaming device display unit (not shown) and outputted through a built in speaker (not shown) of the gaming device. In such implementations, the gaming device is used only as an output device (e.g., visual display and audio output).

In addition, the input assembly unit 1022 on the universal controller 810 is used to accelerate or control a game play of the gaming devices 1050 and 1070. The input elements of the input assembly unit 1022 on the universal controller are selectively mapped to game functions related to the selected game application. The input elements of the input assembly unit 1022 on the universal controller can further include buttons, thumb joysticks, iPod™ ThumbWheel type strip sensors for strolling, rocker switches, thumb wheels (e.g., the Blackberry™ thumb wheel), integrated sensor arrays for re-mapable keys, force-sensitive resistors in various layout arrangements, touchpads, touch sticks, trackballs, and integrated sensor arrays for gesture sensing and processing.

The universal controller 810 can employ various techniques to interpret the data transmitted between the universal controller 810 and the gaming devices 1050 and 1070 through the communication channels 1014 and 1060. For example, a device driver (e.g. a Bluetooth driver or a USB driver) for managing raw data streams can be implemented. Alternatively, a game software development kit (SDK) specially tailored to support fast development of games on the unique games platform disclosed herein can be implemented. Further, a generic input/output SDK designed to harness the input and output capabilities of the universal controller configured to function as a game platform and/or delivery and storage device for collecting data related to the gaming experience of the gaming devices 1050 and 1070 can be implemented.

The data stored in the storage units 1010 and 1064 is stored using various devices and mechanisms. The data can be hard-wired in a non-volatile memory unit of the accessory devices 900. The data can be transferred between the universal controller 810 and the gaming devices 1050 and 1070 using the communication channels 1014 and 1062. Alternatively, the universal controller 810 is implemented to include an input/output (I/O) slot/port (not shown) capable of interfacing with a removable storage unit (not shown). For example, a data cartridge or a compact flash card can be inserted into the I/O slot/port to load new games and/or store transferred data to the universal controller 810. The data cartridge can be implemented to include the following form factors: (1) A proprietary cartridge design manufactured by a branded hand-held content provider company, such as a hand held gaming device manufacturer; (2) A cartridge design with published physical and software interfaces for third party development and deployment; and (3) A standard miniature flash memory device, including but not limited to: mini or micro memory SD cards, XD memory cards, SD memory cards, Compact-Flash memory cards, Memory stick, or other suitable storage devices.

Moreover, the universal controller 810 described herein can be implemented as a "Master" device in communication link with multiple "Slave" or gaming devise 1050 and 1070, etc. The user can easily switch from controlling one gaming device to another easily just by selecting the desired gaming device from a list of gaming devices that may be displayed on a screen or LCD disposed on the input accelerator device.

In any of the above implementations, active and/or passive tactile feedback may be implemented. To provide passive tactile feedback, the input elements of the first and/or second input assemblies may be combined with a palpable detent, such as a dome cap or dome spring so that a user can tactilely perceive, through his fingers or thumbs, activation and/or deactivation of an input element. In one implementation, among others, the palpable detent may be positioned between the actuator and sensor components of the input elements. To provide active tactile feedback, one ore more vibratory units or force producing units may be mounted in the hand-held electronic device and activated to provide tap or index level or other information to a user. The vibratory unit may be an electric motor with an eccentric mass attached to the motor's shaft, a solenoid, a variable reluctance device, a loud speaker or any other vibrator that can provide tactile feedback. A force producing unit may be a solenoid in non-vibratory mode, a motor, non-vibratory actuators or any other actuator that can produce forces. A vibratory unit and/or force producing unit may be provided for each input element . In that case, the vibratory unit and/or force producing unit may be mounted below the input element so that when the vibratory unit and/or force producing unit is activated, the vibratory unit and/or force producing unit can push out the surface of the electronic device to a different level or position depending on the information to be communicated. Thus, in implementations using a pressure sensor pad or touch-pad as the input element, a stepped array may be configured to indicate higher and higher levels of index positions across the touch pad or pressure sensor pad. The vibratory units and/or force producing units may also be used to provide tactile feedback to indicate the momentary achievement of an objective, such as target lock in game applications. Tactile feedback may also be accomplished by actuators, such as a solenoid, which changes the stiffness of the input element electronically or pushes against the user's hand or fingers to indicate an event of interest in the software application.

The computational aspects described here can be implemented in analog or digital electronic circuitry, or in computer hardware, firmware, software, or in combinations of them. Where appropriate, aspects of these systems and techniques can be implemented in a computer program product tangibly embodied in a machine-readable storage device for execution by a programmable processor; and method steps can be performed by a programmable processor executing a program of instructions to perform functions by operating on input data and generating output.

The systems and techniques described above may utilize the biomechanics of the thumb and fingers, i.e., it uses the function of opposition, the fine motor control of the fingers, and the larger range of motion and stronger actuation provided by the thumb. By using the fingers and thumb in concert, the number of taps and time needed to accomplish a given function is reduced, the accuracy is improved, and the natural programming inherent in the human hand replaces the training required for other systems.

A number of implementations have been described. Other implementations may include different or additional features. For example, other configurations of the one or more input elements of the front, rear and side input assemblies may be realized. Also, the input accelerator devices described herein may have more or less than six planar or contoured surfaces. Moreover, the number of input elements in the input assemblies are not limited to the number of input elements described in the implementations above. Also, the one or more input elements of the input assemblies may be any input or selection type known to one of skill in the art, such as keys, buttons, touch pads, other types of pads, rockers, sliders, dials, contact sensors or other actuators associated with any sensor. Each sensor associated with an actuator may include digital momentary on/off switches or analog sensors, such as pressure sensors (e.g., force sensitive resistors, piezoelectric film sensors, or capacitive sensors), or positional sensors (e.g., rotary or linear potentiometers or encoders), or other analog sensors known to those of ordinary skill, or accelerometers or gyroscopes. The input assemblies may include a combination of these different types of input or selection elements, which may be mounted in the configurations shown in the figures or imbedded within the device to permit control through motion of the overall device.

Further, other implementations of the hybrid auxiliary input acceleration device are possible. People already carry around existing accessory devices, which can be instrumented with additional sensors to provide additional input signals to the host device for input acceleration. Devices carried in the purse, in the wallet, or on a keychain are ideal because these devices already serve another primary function, and providing input acceleration via these devices may result in a convergent accelerator device that substantially improves user experience without increasing the number of items that a person needs to carry around. Like the standalone remote control implementation, these convergent input accelerator devices may communicate with the host device wirelessly through a Bluetooth protocol or wirelessly through a rough-line-of-sight infrared link. Alternatively, the convergent input accelerator devices may physically plug into the host device via connectors already present in the host device, such as a headset jack or one of many data ports described above.

In another implementation, the auxiliary input accelerator device may be a car key with a remote keyless entry device, which is a common device that most people carry on their keychain. The remote keyless entry device already has a button, a radio frequency (RF) link, and an on board processor to transmit security information from the remote keyless entry device to a host vehicle to open a door, window, or a trunk; alter climate control settings; or control any other vehicle functions remotely. Most remote keyless entry devices are also small in size and possess comfortable form factor. One or more input assemblies including buttons, touchpads, or continuous sensor strips may be integrated into the remote keyless entry device to convert it into a hybrid device, which may function as an input accelerator device for a host device. The hybrid remote keyless entry input accelerator device can communicate with the host device using a Bluetooth protocol, a long range RF protocol, or Infrared protocol.

In yet another implementation, the auxiliary input accelerator device may be a remote garage door opener. While these remote openers typically tend to be clipped to the visor in a car, they can also be more miniature in size and carried on a keychain. These devices can easily be augmented to have buttons and sensors appropriate for use as an input accelerator device for host device.

In one implementation, the auxiliary input accelerator device may be a programmable radio frequency identification (RFID) keyfob. Today, many workers gain access to their secure workplace via an RFID keyfob. The circuitry in such a keyfob may be housed inside an input accelerator with buttons, sensor arrays and a wireless communication protocol to be used as an auxiliary input accelerator device to the host device.

In another implementation, the auxiliary input accelerator device may be a smartcard. In Europe and Asia, contactless, wireless smartcards based on similar technologies as the RFID keyfob are increasingly being used for a variety of commerce transactions. For example, in District of Columbia Metro Subway System, every terminal is smartcard enabled and people can pay for their subway rides by waving their wallet containing a prepaid smartcard in front of a grounded receptor. Such smartcard may be incorporated into an input accelerator device that may be carried on a keychain. Thus, the smartcard input accelerator may be used to augment interactions with a host device as well as serve as the primary mode of identification and payment in everyday life.

In yet another implementation, the auxiliary input accelerator device may be a universal remote control device. A pocket size universal remote control device with soft keys may be configured to control all standard home entertainment devices such as televisions, DVD players, VHS players, and sound systems in addition to a host device such as a cellular phone. The universal remote control device may either use the same infrared link to communicate with home entertainment devices and with the cellular phone, or it may communicate with the cellular phone using another wireless protocol, such as Bluetooth protocol.

In yet another implementation, the auxiliary input accelerator device may be a digital wristwatch incorporating the functionality of the input accelerator device. Digital wrist watches, especially running or exercise watches, typically have a digital display and a number of buttons for tracking lap times, heart rate and other important biostatistics. They also typically have a larger surface area than typical wrist watches. These watches may readily be programmed and retrofitted with optional additional sensor arrays to be used as an input accelerator for the host device.

In one implementation, the auxiliary input accelerator device may be an MP3 device such as an iPod. While multimedia content delivery on the mobile platform is becoming a norm, currently many people still carry a separate MP3 player for listening to music. The iPod or other MP3 players already incorporate sensors and buttons, which may be easily augmented to be used as the input accelerator device for interfacing with the host device, such as a cellular phone. The MP3 player may connect to the host device using an existing or added wireless protocol, such as Bluetooth.

In one implementation, the auxiliary input accelerator device may be an ultimate wireless converged remote controller device. Some or all of the above implementations may be combined into a single converged input accelerator device, The form factor of the device may be a keyfob form factor to go on a key chain, a wrist watch form factor to go on the wrist, or any other miniature form factor that facilitate portability. The ultimate converged remote controller device may perform all of the following functions in addition to controlling any additional devices possessing a short or long range wireless link. The ultimate converged remote controller device may function as an input accelerator for cellular phones, with keys and optional sensor arrays; a remote keyless entry device with a long range RF circuitry; a remote garage door opener; a RFID keyfob with a short range passive RF circuitry; a smartcard for identification and commerce with a short range passive RF circuitry; an universal remote controller device for home entertainment systems; and/or any other auxiliary functions people may want to incorporate.

Moreover, the methods to provide data input, device control or game control may be performed in a different order and still achieve desirable results. Accordingly, other implementations are within the scope of the following claims.

What is claimed is:

1. A universal controller for interfacing with gaming devices comprising:
   a communication channel configured to selectively establish a bidirectional communication link with a first gaming device;
   a data collection unit communicatively coupled to the communication channel, the data collection unit operable to collect data received from the first gaming device, the data related to a gaming experience of the first gaming device;
   a storage unit communicatively coupled to the data collection unit, the storage unit configured to store the collected data related to the gaming experience of the first gaming device; and
   an input assembly comprising a plurality of input elements, each input element configured to be mapped to one or more functions of the first gaming device and a second gaming device;
   wherein after being communicatively decoupled from the first gaming device, the universal controller is operable to transfer to the second gaming device the data related to the gaming experience of the first gaming device and to control the second gaming device such that a gaming experience of the second gaming device is affected by the transferred data; and wherein the first gaming device comprises a remote-controlled toy and the second gaming device comprises a video game device.

2. The universal controller of claim 1, wherein the toy comprises one selected from a group of a remote-controlled car, a remote-controlled robot, and a remote controlled doll.

3. The universal controller of claim 1, wherein the video game device comprises one selected from a group of a video game console, a hand-held video game device, a personal computer, and a mobile communication device.

4. The universal controller of claim 1, wherein the data related to the gaming experience of the first gaming device comprises data on usage of the first gaming device.

5. The universal controller of claim 4, wherein the data on the usage of the first gaming device is used to determine whether a replacement part for the first gaming device is needed.

6. The universal controller of claim 1, wherein the data related to the gaming experience of the first gaming device comprises data on performance of the first gaming device.

7. The universal controller of claim 6, wherein the data on the performance of the first gaming device is used to customize the gaming experience of the second gaming device.

8. The universal controller of claim 6, wherein the data on the performance of the first gaming device is transferred to the second gaming device to compete in a video game.

9. The universal controller of claim 8, wherein the video game comprises a video game representation of the first gaming device.

10. A method performed by a hand-held controller, the method comprising:
    controlling, by the hand-held controller, one or more input functions corresponding to a gaming experience of a first gaming device;
    collecting, by the hand-held controller, data received from the first gaming device, the data related to the gaming experience of the first gaming device;
    storing, at the hand-held controller, the received data related to the gaming experience of the first gaming device;
    transferring from the hand-held controller, after being communicatively decoupled from the first gaming device, to a second gaming device the stored data related to the gaming experience of the first gaming device such that a gaming experience of the second gaming device is affected by the transferred data; and
    controlling, by the hand-held controller, after being communicatively decoupled from the first gaming device, one or more input functions corresponding to the gaming experience of the second gaming device based on the transferred data related to the gaming experience of the first gaming device; wherein controlling one or more input functions corresponding to a gaming experience of a first gaming device comprises controlling one or more input functions corresponding to a remote-controlled toy.

11. The method of claim 10, wherein controlling one or more input functions corresponding to a gaming experience of a remote-controlled toy comprises controlling one selected from a group of a remote-controlled car, a remote-controlled robot, and a remote controlled doll.

12. The method of claim 10, wherein transferring to the second gaming device the stored data related to the gaming experience of the first gaming device comprises transferring data to a video game device.

13. The method of claim 12, wherein transferring data to a video game comprises transferring data to one selected from a group of a video game console, a hand-held video game device, a personal computer, and a mobile communication device.

14. The method of claim 10, wherein collecting data related to the gaming experience of the first gaming device comprises collecting data on usage of the first gaming device.

15. The method of claim 10, wherein transferring to the second gaming device the data related to the gaming experience of the first gaming device comprises transferring to the second gaming device data on the usage of the first gaming device, wherein the transferred data on the usage of the first gaming device is used to determine whether a replacement part for the first gaming device is needed.

16. The method of claim 10, wherein collecting the data related to the gaming experience of the first gaming device comprises collecting data on performance of the first gaming device.

17. The method of claim 16, wherein transferring to the second gaming device the data related to the gaming experience of the first gaming device comprises transferring to the second gaming device the data on the performance of the first gaming device, wherein the transferred data on the performance of the first gaming device is used to customize the gaming experience of the second gaming device.

18. The method of claim 16, wherein transferring to the second gaming device the data related to the gaming experience of the first gaming device comprises transferring to the second gaming device the data on the performance of the first gaming device, wherein the transferred data on the performance of the first gaming device is used to compete in a video game executing on the second gaming device.

* * * * *